United States Patent [19]

Bertram et al.

[11] Patent Number: 4,925,901

[45] Date of Patent: * May 15, 1990

[54] LATENT, CURABLE, CATALYZED MIXTURES OF EPOXY-CONTAINING AND PHENOLIC HYDROXYL-CONTAINING COMPOUNDS

[75] Inventors: James L. Bertram, Lake Jackson; Louis L. Walker, Clute; John W. Muskopf, Lake Jackson, all of Tex.

[73] Assignee: The Dow Chemical Company, Midland, Mich.

[*] Notice: The portion of the term of this patent subsequent to Feb. 16, 2005 has been disclaimed.

[21] Appl. No.: 274,250

[22] Filed: Nov. 18, 1988

Related U.S. Application Data

[63] Continuation-in-part of Ser. No. 155,381, Feb. 12, 1988, abandoned, which is a continuation-in-part of Ser. No. 21,837, Mar. 4, 1987, Pat. No. 4,725,652, which is a continuation-in-part of Ser. No. 849,087, Apr. 7, 1986, abandoned, which is a continuation-in-part of Ser. No. 716,279, Mar. 25, 1985, Pat. No. 4,594,291, which is a continuation-in-part of Ser. No. 631,676, Jul. 17, 1984, abandoned.

[51] Int. Cl.[5] ............................................. C08G 59/68
[52] U.S. Cl. .................... 525/482; 525/485; 525/486; 525/504; 525/505; 525/506; 525/507; 525/523; 528/88; 528/89; 528/90; 528/91; 528/92; 528/93; 528/94
[58] Field of Search ............... 528/89, 91, 92, 93, 528/94, 88; 525/485, 486, 504, 505, 506, 507, 523, 482

[56] References Cited

U.S. PATENT DOCUMENTS

| | | | |
|---|---|---|---|
| 3,048,552 | 8/1962 | Fang | 260/28.5 |
| 3,947,395 | 3/1976 | Ogata et al. | 260/28 P |
| 4,069,055 | 1/1978 | Crivello | 528/92 X |
| 4,358,578 | 11/1982 | Brownscombe | 528/91 |
| 4,503,211 | 3/1985 | Robins | 528/92 |
| 4,594,291 | 6/1986 | Bertram et al. | 528/97 X |
| 4,725,652 | 2/1988 | Bertram et al. | 528/91 X |
| 4,766,196 | 8/1988 | Goel et al. | 528/91 X |
| 4,775,734 | 10/1988 | Goel | 528/89 |

FOREIGN PATENT DOCUMENTS 58-138729 8/1983 Japan .
963058 7/1964 United Kingdom .

OTHER PUBLICATIONS

"On the Thermal Behaviour of Some Alkylammonium Tetrafluoroborates", Zabinska, Ferloni and Sanesi, *Journ. Calorim., Anal. Therm. Thermodyn. Chim.*, vol. 17, pp. 250–253 (1986).

"Proposed Mechanism for the Curing of Epoxy Resins with Amine-Lewis Acid Complexes or Salts", J. J. Harris et al, *J. Ap. Pol. Sc.*, vol. 10, pp. 523–534 (1966).

*Primary Examiner*—Earl Nielsen

[57] ABSTRACT

Storage stable compositions are disclosed which comprise an epoxide containing compound, a phenolic hydroxyl containing compound, and a catalyst compound for catalyzing the reaction between epoxide groups and aromatic hydroxyl groups which catalyst comprises the product resulting from contacting an onium salt, amine, or amine salt with an acid or a salt of an acid having a weak nucleophilic anion.

142 Claims, No Drawings

LATENT, CURABLE, CATALYZED MIXTURES OF EPOXY-CONTAINING AND PHENOLIC HYDROXYL-CONTAINING COMPOUNDS

CROSS-REFERENCE TO RELATED APPLICATIONS

This application is a continuation-in-part of application Ser. No. 155,381 filed Feb. 12, 1988 (now abandoned), which is a continuation-in-part of application Ser. No. 021,837 filed Mar. 4, 1987 (now U.S. Pat. No. 4,725,652), which is a continuation-in-part of application Ser. No. 849,087 filed Apr. 7, 1986 (now abandoned), which is a continuation-in-part of application Ser. No. 716,279 filed Mar. 25, 1985, (now U.S. Pat. No. 4,594,291), which is a continuation-in-part of application Ser. No. 631,676, filed Jul. 17, 1984 (now abandoned); all of which are incorporated herein by reference.

FIELD OF THE INVENTION

The present invention concerns latent, curable, catalyzed mixtures of epoxy-containing compounds and aromatic hydroxyl-containing compounds. The present invention also concerns latent catalysts and epoxy resin compositions containing them.

BACKGROUND OF THE INVENTION

Epoxy resins have been precatalyzed with phosphonium and other compounds to provide latent compositions which form advanced, higher molecular weight epoxy resins when admixed with an aromatic hydroxyl-containing compound as disclosed by Perry in U.S. Pat. No. 3,948,855 and Can. No. 893,191; by Dante et al. in U.S. Pat. No. 3,477,990; by Mueller et al. in U.S. Pat. No. 3,547,881; by Tyler, Jr. et al. in U.S. Pat. No. 4,366,295; and by Cragar in Can. No. 858,648.

While compositions containing these catalysts and an epoxy resin are somewhat stable, such compositions which also contain an aromatic hydroxyl-containing compound are lacking in stability.

Curable compositions containing epoxy resins and aromatic hydroxyl-containing compounds and a catalyst therefor would be highly desirable in the preparation of storage stable coatings, storage stable electrical encapsulants, storage stable formulations for preparing mechanical and electrical laminates and composites, storage stable one package molding compositions, storage stable curable compositions for use in resin transfer molding (RTM) and reaction injection molding (RIM) applications and the like.

SUMMARY OF THE INVENTION

The present invention pertains to compositions comprising (A) at least one compound containing an average of more than one epoxide group per molecule; (B) at least one compound containing an average of more than one aromatic hydroxyl group per molecule, other than an alkenylphenol polymer; and (C) at least one of (1) the product resulting from contacting (a) at least one onium compound of the element nitrogen, phosphorus, sulfur or arsenic with (b) an inorganic acid or metal salt of an inorganic acid, said acid having a weak-nucleophilic anion or a combination of such acids or metal salts; (2) the product resulting from contacting (a) at least one amine compound with (b) at least one inorganic acid having a weak-nucleophilic anion; or (3) the product resulting from contacting (a) at least one adduct of an acid having a relatively strong-nucleophilic anion and an amine compound with (b) an inorganic acid or metal salt of an inorganic acid, said acid having a weak-nucleophilic anion or a combination of such acids or metal salts; wherein (i) components (a) and (b) are contacted in quantities which permit the composition to satisfy the viscosity requirements of the composition after storage at 50° C. for 14 days; (ii) components (A) and (B) are present in quantities which provide a ratio of aromatic hydroxyl groups to epoxide group of from about 0.05:1 to about 20:1; and (iii) a mixture of components (A), (B), and (C), when dissolved in 20 to 40 percent by weight of a suitable solvent or solvent mixture, has a viscosity measured at 25° C. of 75% or less than the viscosity of a like composition except that the catalyst consists only of component (a), said viscosity being determined after storage for 14 days at 50° C.

The term weak-nucleophilic as employed herein means that the material has a nucleophilicity value "n" from about zero to less than about 2.5 as described by C. G. Swain and C. B. Scott in J. Am. Chem. Soc., Vol. 75, p. 141 (1953) which is incorporated herein by reference.

The term relatively strong-nucleophilic as employed herein means that the material has a nucleophilicity value "n" of 2.5 or greater as described by C. G. Swain and C. B. Scott in J. Am. Chem. Soc., Vol. 75, p. 141 (1953) which is incorporated herein by reference.

DETAILED DESCRIPTION OF THE INVENTION

The catalysts employed in the present invention are prepared by simply mixing in the desired proportions and stirring to insure intimate contact the onium, amine or nitrogen-containing compound with the acid or salt of an acid having a weak-nucleophilic anion and which acid or acid salt is free of any organic substituent. The contact can be conducted at temperatures of from about 0° C. to about 100° C., preferably from about 20° C. to about 60° C. for a time sufficient to complete any reaction which occurs. The time depends upon the temperature, but usually from about 1 to about 120, preferably from about 5 to about 60 minutes is sufficient.

The components from which the catalysts are prepared are mixed in proportions which provide from about 0.6 to about 1.4, usually from about 0.75 to about 1.35, moles of acid per mole of onium, amine or heterocyclic nitrogen-containing compound. The preferred ratios depend upon which onium, amine or heterocyclic amine compound is mixed with the acid or acid salt. For example, the preferred ratio of moles of acid or acid salt per mole of imidazole compound is from about 0.85:1 to about 1.12:1 while the most preferred ratio is in the range of from about 0.93:1 to about 1.1:1. For phosphonium compounds, the preferred ratio is from about 0.95:1 to about 1.35:1, more preferably from about 1.1:1 to about 1.25:1 moles of acid per mole of phosphonium compound. For other catalysts, it is easy to determine the optimum ratios of acid or acid salt to onium, amine or heterocyclic amine compound by mixing the components together in various ratios and conducting simple, routine experiments such as those described in examples 1–9, 18–26 and 39–45. When the amount of acid or acid salt is less than about 0.6 mole per mole of imidazole the catalyst is less latent and begins to approach the reactivity of the original imidazole prior to reaction with the acid or acid salt. When the amount of acid or acid salt is more than about 1.4 moles per mole of phosphonium, the catalyst becomes less latent to the point that at a ratio of about 1.5:1 the catalyst becomes an accelerator as compared to the original onium-containing compound prior to reaction with the acid. When the amount of acid or acid salt is more than about 1.14 moles per mole of imidazole, the catalyst becomes less latent to the point that at a ratio of about 1.17:1 the catalyst becomes an accelerator as compared to the original imidazole compound prior to reaction with the acid or acid salt.

The catalyst is employed in amounts sufficient to catalyze the reaction between components (A) and (B) when heated to a temperature of at least about 75° C. In most instances, the quantity of catalyst is from about 0.05 to about 100, suitably from about 0.1 to about 50, more suitably from about 0.5 to about 20, most suitably from about 1 to about 10 millimoles of catalyst per epoxide equivalent.

Suitable onium compounds which can be employed herein include, ammonium, phosphonium, sulfonium and arsonium compounds. Particularly suitable such compounds include, those represented by the following formulas IA or IB

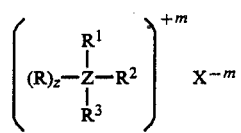

Formula IA.

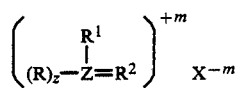

Formula IB.

wherein each R, $R^1$, $R^2$ and $R^3$ is independently a hydrocarbyl group having from 1 to about 18, preferably from about 1 to about 9, carbon atoms, or a hydrocarbyl group having from 1 to about 18, preferably from 1 to about 9 carbon atoms which group also contains one or more oxygen, sulfur, halogen, or nitrogen atoms or two of such R, $R^1$, $R^2$ and $R^3$ groups can combine to form a heterocyclic ring containing one or more atoms other than carbon atoms; each X is the anion portion of an acid of a relatively strong nucleophilic acid; Z is phosphorus, nitrogen, sulfur or arsenic; m has a value equal to the valence of the anion X; and z has a value of zero or 1 depending on the valence of Z. Particularly suitable onium or amine compounds which can be reacted or complexed with the inorganic acids having a weak-nucleophilic anion to form the catalysts of the present invention include, for example, ethyltriphenyl phosphonium acetate, ethyltriphenyl phosphonium acetate•acetic acid complex, tetrabutyl phosphonium acetate, tetrabutyl phosphonium acetate•acetic acid complex, ethyltriphenyl phosphonium chloride, ethyl triphenyl phosphonium iodide, tetrabutyl phosphonium chloride, tetrabutyl phosphonium iodide, tetrabutylphosphonium hydroxide, tetrabutylammonium hydroxide, tetraethylammonium hydroxide, tetramethylammonium hydroxide, N-methylmorpholine, 2-methylimidazole, triethylamine, N,N,N',N'-tetramethylethylenediamine, ethyltri(2-hydroxyethyl)-ammonium hydroxide, ethyltri(2-ethoxyethyl)ammonium hydroxide, triethyl(2-thioethylethyl)ammonium hydroxide, N-methyl-N-methylenemethanaminium acetate, N-methyl-N-methylenemethanaminium acetate•acetic acid complex, N-methyl-N-methylenemethanaminium chloride, N-methyl-N-methylenemethanaminium iodide, N-methylpyridinium acetate, N-methylpyridinium acetate•acetic acid complex, N-methylpyridinium chloride, N-methylpyridinium iodide, 1-ethyl-2,3-dimethylimidazolium acetate, 1-ethyl-2,3-dimethyl-imidazolium acetate•acetic acid complex, 1-ethyl-2,3-dimethylimidazolium chloride, 1-ethyl-2,3-dimethyl-imidazolium iodide, N-methylquinolinium acetate, N-methylquinolinium acetate•acetic acid complex, N-methylquinolinium chloride, N-methylquinolinium iodide, N-methyl-1,3,5-triazinium acetate, N-methyl-1,3,5-triazinium acetate•acetic acid complex, N-methyl-1,3,5-triazinium chloride, N-methyl-1,3,5-triazinium iodide, combinations thereof and the like.

Suitable relatively strong-nucleophilic acid anions include, for example, carboxylates, halides, phosphates, phosphites, carbonates, bicarbonates, hydroxide, cyanide, thiol, sulfate, thiosulfate, and the like. Particularly suitable such nucleophilic acid anions include, for example, acetate, acetate•acetic acid complex, propionate, chloride, iodide, and the like.

Particularly suitable onium or amine-acid complexes which can be reacted with the salt of inorganic acids having a weak-nucleophilic anion to form the catalysts employed in the present invention include, for example, tetrabutylphosphonium chloride, tetrabutylammonium chloride, tetraethylammonium chloride, tetramethylammonium chloride, triethylamine hydrochloride, 2-methylimidazole hydrochloride, N-methylmorpholine hydrochloride, ethyltri(2-hydroxyethyl)ammonium chloride, triethyl(2-thioethylethyl)ammonium chloride, mixtures thereof and the like.

The amine compounds which can be suitably employed herein include, for example, primary, secondary, tertiary, aliphatic, cycloaliphatic or heterocyclic amines.

Suitable non-heterocyclic amines which can be employed herein include, those containing suitably from 1 to about 60, more suitably from about 2 to about 27, most suitably from about 2 to about 18, carbon atoms. Particularly suitable such amines include, for example, ethylamine, diethylamine, triethylamine, n-propylamine, di-n-propylamine, tri-n-propylamine, isopropylamine, diisopropylamine, triisopropylamine, butylamine, dibutylamine, tributylamine, methyldibutylamine, combinations thereof and the like.

Suitable heterocyclic secondary and tertiary amines or nitrogen-containing compounds which can be employed herein include, for example, imidazoles, imidazolidines, imidazolines, oxazoles, pyrroles, thiazoles, pyridines, pyrazines, morpholines, pyridazines, pyrimidines, pyrrolidines, pyrazoles, quinoxalines, quinazolines, phthalozines, quinolines, purines, indazoles, indoles, indolazines, phenazines, phenarsazines, phenothiazines, pyrrolines, indolines, piperidines, piperazines, combinations thereof and the like.

Suitable imidazole compounds which can be employed herein include, for example, those represented by the following formula II $$R^a-\underset{\underset{\underset{R^b}{|}}{N}}{C^2}\overset{N^3\text{———}C^4-R^d}{\underset{5}{\diagdown \diagup}}C-R^c$$

Formula II.

wherein each $R^a$, $R^b$, $R^c$ and $R^d$ is independently hydrogen, halogen, cyano or a hydrocarbyl group having suitably from 1 to about 18, more suitably from 1 to about 9, carbon atoms or such hydrocarbyl groups containing an oxygen, sulfur or halogen or the like substitutent, or $R^b$ and $R^c$ can combine to form a 5 or 6 membered ring with the carbon and nitrogen atoms from the imidazole ring to which they are attached or $R^c$ and $R^d$ can combine to form a 5 or 6 membered ring with the two carbon atoms from the imidazole ring to which they are attached. Particularly suitable imidazole compounds include, for example, 2-methylimidazole, 2-ethylimidazole, 2-propylimidazole, 2-butylimidazole, 2-pentylimidazole, 2-hexylimidazole, 2-cyclohexylimidazole, 2-phenylimidazole, 2-nonylimidazole, 2-undecylimidazole, 2-heptadecylimidazole, 2-ethyl-4-methylimidazole, 2-phenyl-4-methylimidazole, 1-benzylimidazole, 1-ethyl-2-methylbenzimidazole, 2-methyl-5,6-benzimidazole, 1-vinylimidazole, 1-allyl-2-methylimidazole, 2-cyanoimidazole, 2-chloroimidazole, 2-bromoimidazole, combinations thereof and the like. Suitable imidazoles wherein one or more of the $R^a$, $R^b$, $R^c$, or $R^d$ group contain oxygen, sulfur or halogen or the like substitutents include, for example, 1-(2-hydroxypropyl)-2-methylimidazole, 2-phenyl-4,5-dimethylolimidazole, 2-phenyl-4-methyl-5-hydroxymethylimidazole, 2-chloromethylbenzimidazole, 2-hydroxybenzimidazole, any combination thereof and the like. Most particularly suitable are 2-methylimidazole, 2-ethyl-4-methylimidazole, 1,2-dimethylimidazole and 2-phenylimidazole.

Suitable pyrazole compounds which can be employed herein include, for example, those represented by the following formula III

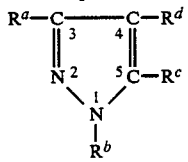

Formula III.

wherein each $R^a$, $R^b$, $R^c$ and $R^d$ is independently hydrogen, halogen, cyano or a hydrocarbyl group having suitably from 1 to about 18, more suitably from 1 to about 9, carbon atoms or such hydrocarbyl groups containing an oxygen, sulfur, cyano or halogen or the like substitutent, or $R^b$ and $R^c$ can combine to form a 5 or 6 membered ring with the carbon and nitrogen atoms from the imidazole ring to which they are attached or $R^c$ and $R^d$ can combine to form a 5 or 6 membered ring with the two carbon atoms from the pyrazole ring to which they are attached. Particularly suitable pyrazole compounds include, for example, pyrazole, 1-methylpyrazole, 3-methylpyrazole, 4-butylpyrazole, 1-methyl-3-propylpyrazole, 3-ethyl-5-methylpyrazole, 1-(3-hydroxypropyl)pyrazole, 5-phenylpyrazole, 5-benzylpyrazole, 1-phenyl-3-methylpyrazole, 1-cyanopyrazole, 3-chloropyrazole, 4-bromo-1-methylpyrazole, any combination thereof and the like.

Suitable oxazole compounds which can be employed herein include, for example, those represented by the following formula IV

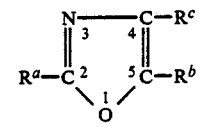

Formula IV.

wherein each $R^a$, $R^b$, and $R^c$ is independently hydrogen, halogen, cyano or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable oxazole compounds include, for example, oxazole, 4-methyloxazole, 2-methyloxazole, 4-butyloxazole, 2-methyl-5-propyloxazole, 2-ethyl-4-methyloxazole, 2-(3-hydroxypropyl)oxazole, 4-phenyloxazole, 5-benzyloxazole, 2-phenyl-5-methyloxazole, 2-cyanooxazole, 4-chlorooxazole, 4-bromo-2-methyloxazole, any combination thereof and the like.

Suitable imidazolidine compounds which can be employed herein include, for example, those represented by the following formula V

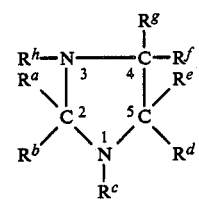

Formula V.

wherein each $R^a$, $R^b$, $R^c$, $R^d$, $R^e$, $R^f$, $R^g$ and $R^h$ is independently hydrogen, halogen, cyano or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable imidazolidine compounds include, for example, imidazolidine, 1-methylimidazolidine, 2-methylimidazolidine, 4-butylimidazolidine, 1-methyl-3-propylimidazolidine, 1-ethyl-4-methylimidazolidine, 1-(3-hydroxypropyl)imidazolidine, 2-phenylimidazolidine, 1-benzylimidazolidine, 2-phenyl-1-methylimidazolidine, 4-cyanoimidazolidine, 4-chloroimidazolidine, 4-bromo-1-methylimidazolidine, any combination thereof and the like.

Suitable imidazoline compounds which can be employed herein include, for example, those represented by the following formula VI

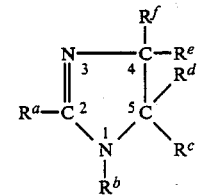

Formula VI.

wherein each $R^a$, $R^b$, $R^c$, $R^d$, $R^e$ and $R^f$ is independently hydrogen, halogen, cyano or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable imidazoline compounds include, for example, imidazoline, 1- methylimidazolidine, 2-methylimidazolidine, 4-butylimidazolidine, 1-methyl-2-propylimidazolidine, 1-ethyl-4-methylimidazolidine, 1-(3-hydroxypropyl)imidazolidine, 2-phenylimidazolidine, 1-benzylimidazolidine, 2-phenyl-1-methylimidazolidine, 4-cyanoimidazolidine, 5-chloroimidazolidine, 5-bromo-1-methylimidazolidine, any combination thereof and the like.

Suitable thiazole compounds which can be employed herein include, for example, those represented by the following formula VII

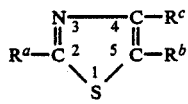

Formula VII.

wherein each $R^a$, $R^b$, and $R^c$ is independently hydrogen, halogen, cyano or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable thiazole compounds include, for example, thiazole, 2-methylthiazole, 5-methylthiazole, 4-butylthiazole, 2-methyl-4-propylthiazole, 4-ethyl-5-methylthiazole, 2-(3-hydroxypropyl)thiazole, 2-phenylthiazole, 2-benzylthiazole, 4-phenyl-5-methylthiazole, 2-cyanothiazole, 5-chlorothiazole, 5-bromo-2-methylthiazole, any combination thereof and the like.

Suitable pyrrole compounds which can be employed herein include, for example, those represented by the following formula VIII

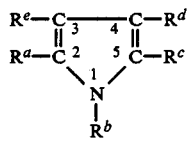

Formula VIII.

wherein each $R^a$, $R^b$, $R^c$, $R^d$ and $R^e$ is independently hydrogen, halogen, cyano or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable pyrrole compounds include, for example, pyrrole, 1-methylpyrrole, 2-methylpyrrole, 3-butylpyrrole, 1-methyl-2-propylpyrrole, 2-ethyl-3-methylpyrrole, 1-(3-hydroxypropyl)pyrrole, 2-phenylpyrrole, 1-benzylpyrrole, 2-phenyl-1-methylpyrrole, 3-cyanopyrrole, 3-chloropyrrole, 2-bromo-1-methylpyrrole, any combination thereof and the like.

Suitable pyridine compounds which can be employed herein include, for example, those represented by the following formula IX

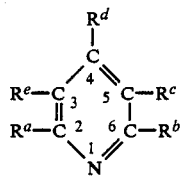

Formula IX.

wherein each $R^a$, $R^b$, $R^c$, $R^d$ and $R^e$ is independently hydrogen, halogen, cyano or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable pyridine compounds include, for example, pyridine, 2-methylpyridine, 3-methylpyridine, 4-butylpyridine, 2-methyl-3-propylpyridine, 3-ethyl-4-methylpyridine, 4-(3-hydroxypropyl)pyridine, 2-phenylpyridine, 3-benzylpyridine, 4-phenyl-2-methylpyridine, 3-cyanopyridine, 2-chloropyridine, 3-bromo-5-methylpyridine, any combination thereof and the like.

Suitable pyrazine compounds which can be employed herein include, for example, those represented by the following formula X

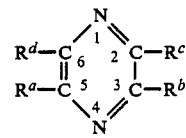

Formula X.

wherein each $R^a$, $R^b$, $R^c$ and $R^d$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable pyrazine compounds include, for example, pyrazine, 2-methylpyrazine, 3-methylpyrazine, 2-butylpyrazine, 2-methyl-5-propylpyrazine, 2-ethyl-6-methylpyrazine, 2-(3-hydroxypropyl)pyrazine, 2-phenylpyrazine, 2-benzylpyrazine, 2-phenyl-3-methylpyrazine, 2-cyanopyrazine, 2-chloropyrazine, 2-bromo-5-methylpyrazine, any combination thereof and the like.

Suitable pyridazine compounds which can be employed herein include, for example, those represented by the following formula XI

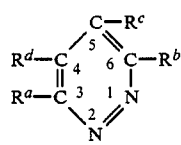

Formula XI.

wherein each $R^a$, $R^b$, $R^c$, and $R^d$ is independently hydrogen, hydrogen, halogen, cyano or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable pyridazine compounds include, for example, pyridazine, 3-methylpyridazine, 4-methylpyridazine, 3-butylpyridazine, 3-methyl-4-propylpyridazine, 3-ethyl-6-methylpyridazine, 4-(3-hydroxypropyl)pyridazine, 3-phenylpyridazine, 4-benzylpyridazine, 4-phenyl-5-methylpyridazine, 4-cyanopyridazine, 4-chloropyridazine, 3-bromo-5-methylpyridazine, any combination thereof and the like.

Suitable pyrrolidine compounds which can be employed herein include, for example, those represented by the following formula XII

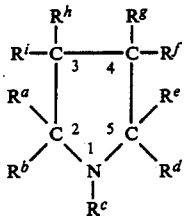

Formula XII.

wherein each $R^a$, $R^b$, $R^c$, $R^d$, $R^e$, $R^f$, $R^g$, $R^h$ and $R^i$ is independently hydrogen, halogen, cyano or a hydrocarbyl group having from 1 to about 18 carbon atoms or such hydrocarbyl groups containing an oxygen, sulfur, cyano or halogen or the like substitutent. Particularly suitable compounds include, for example, pyrrolidine, 1-methyl-pyrrolidine, 4-phenylpyrrolidine, 2-methylpyrrolidine, 3-methylpyrrolidine, 1-butylpyrrolidine, 1-methyl-2-propylpyrrolidine, 3-ethyl-4-methyl-pyrrolidine, 2-(3-hydroxypropyl)pyrrolidine, 1-phenyl-2-methylpyrrolidine, 2-cyanopyrrolidine, 2-chloropyrrolidine, 2-bromo-1-methylpyrrolidine, any combination thereof and the like.

Suitable morpholine compounds which can be employed herein include, for example, those represented by the following formula XIII

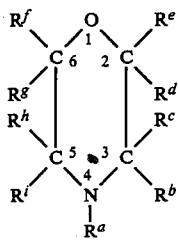

Formula XIII.

wherein each $R^a$, $R^b$, $R^c$, $R^d$, $R^e$, $R^f$, $R^g$, $R^h$ and $R^i$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable morpholine compounds include, for example, morpholine, 4-methylmorpholine, 3-methylmorpholine, 4-butylmorpholine, 4-methyl-3-propylmorpholine, 2-ethyl-3-methylmorpholine, 4-(3-hydroxypropyl)morpholine, 2-phenylmorpholine, 4-benzylmorpholine, 3-phenyl-1-methylmorpholine, 3-cyanomorpholine, 3-chloromorpholine, 3-bromo-4-methylmorpholine, any combination thereof and the like.

Suitable pyrimidine compounds which can be employed herein include, for example, those represented by the following formula XIV

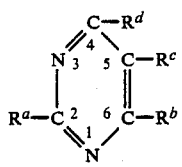

Formula XIV.

wherein each $R^a$, $R^b$, $R^c$ and $R^d$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable pyrimidine compounds which can be employed herein include, for example, pyrimidine, 2-methylpyrimidine, 4-methylpyrimidine, 2-butylpyrimidine, 2-methyl-4-propylpyrimidine, 4-ethyl-5-methylpyrimidine, 2-(3-hydroxypropyl)pyrimidine, 2-phenylpyrimidine, 2-benzylpyrimidine, 4-phenyl-2-methylpyrimidine, 4-cyanopyrimidine, 2-chloropyrimidine, 4-bromo-2-methylpyrimidine, any combination thereof and the like.

Suitable quinoxaline compounds which can be employed herein include, for example, those represented by the following formula XV

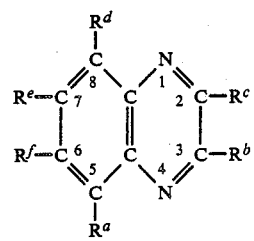

Formula XV.

wherein each $R^a$, $R^b$, $R^c$, $R^d$, $R^e$, and $R^f$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable quinoxaline compounds include, for example, quinoxaline, 2-methylquinoxaline, 5-methylquinoxaline, 2-butylquinoxaline, 2-methyl-3-propylquinoxaline, 5-ethyl-6-methylquinoxaline, 2-(3-hydroxypropyl)quinoxaline, 2-phenylquinoxaline, 5-benzylquinoxaline, 2-phenyl-5-methylquinoxaline, 2-cyanoquinoxaline, 2-chloroquinoxaline, 2-bromo-5-methylquinoxaline, any combination thereof and the like.

Suitable quinazoline compounds which can be employed herein include, for example, those represented by the following formula XVI

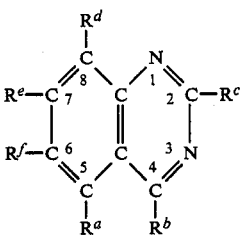

Formula XVI.

wherein each $R^a$, $R^b$, $R^c$, $R^d$, $R^e$, and $R^f$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substitutent. Suitable quinazoline compounds include, for example, quinazoline, 2-methylquinazoline, 4-methylquinazoline, 2-butylquinazoline, 2-methyl-4-propylquinazoline, 5-ethyl-6-methylquinazoline, 2-(3-hydroxypropyl)quinazoline, 2-phenylquinazoline, 2-benzylquinazoline, 2-phenyl-4-methylquinazoline, 4-cyanoquinazoline, 4-chloroquinazoline, 2-bromo-4-methylquinazoline, any combination thereof and the like.

Suitable phthalazine compounds which can be employed herein include, for example, those represented by the following formula XVII

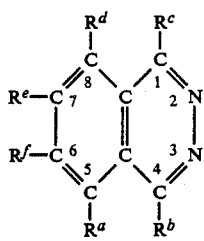

Formula XVII.

wherein each $R^a$, $R^b$, $R^c$, $R^d$, $R^e$, and $R^f$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substitutent. Suitable phthalazine compounds include, for example, phthalazine, 1-methylphthalazine, 6-methylphthalazine, 1-butylphthalazine, 1-methyl-4-propylphthalazine, 1-ethyl-6-methylphthalazine, 1-(3-hydroxypropyl)phthalazine, 5-phenylphthalazine, 1-benzylphthalazine, 1-phenyl-4-methylphthalazine, 1-cyanophthalazine, 1-chlorophthalazine, 1-bromo-4-methylphthalazine, any combination thereof and the like.

Suitable quinoline compounds which can be employed herein include, for example, those represented by the following formula XVIII

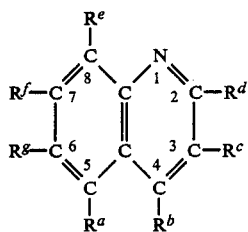

Formula XVIII.

wherein each $R^a$, $R^b$, $R^c$, $R^d$, $R^e$, $R^f$ and $R^g$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substitutent. Suitable quinoline compounds which can be employed herein include, for example, quinoline, 2-methylquinoline, 3-methylquinoline, 4-butylquinoline, 5-methyl-2-propylquinoline, 2-ethyl-3-methylquinoline, 3-(3-hydroxypropyl)quinoline, 3-phenylquinoline, 4-benzylquinoline, 3-phenyl-2-methylquinoline, 3-cyanoquinoline, 4-chloroquinoline, 2-bromo-3-methylquinoline, any combination thereof and the like.

Suitable purine compounds which can be employed herein include, for example, those represented by the following formula XIX

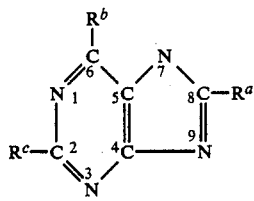

Formula XIX.

wherein each $R^a$, $R^b$, and $R^c$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substitutent. Suitable purine compounds include, for example, purine, 2-methylpurine, 8-methylpurine, 6-butylpurine, 2-methyl-8-propylpurine, 6-ethyl-8-methylpurine, 8-(3-hydroxypropyl)purine, 2-phenylpurine, 2-benzylpurine, 6-phenyl-2-methylpurine, 8-cyanopurine, 2-chloropurine, 8-bromo-2-methylpurine, any combination thereof and the like.

Suitable indazole compounds which can be employed herein include, for example, those represented by the following formula XX

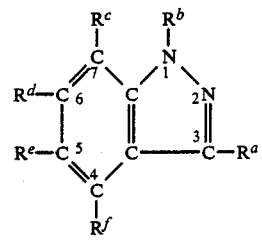

Formula XX.

wherein each $R^a$, $R^b$, $R^c$, $R^d$, $R^e$ and $R^f$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substitutent. Suitable indazole compounds include, for example, indazole, 1-methylindazole, 3-methylindazole, 1-butylindazole, 1-methyl-3-propylindazole, 1-ethyl-5-methylindazole, 3-(3-hydroxypropyl)indazole, 3-phenylindazole, 6-benzylindazole, 6-phenyl-1-methylindazole, 3-cyanoindazole, 5-chloroindazole, 3-bromo-1-methylindazole, any combination thereof and the like.

Suitable indole compounds which can be employed herein include, for example, those represented by the following formula XXI

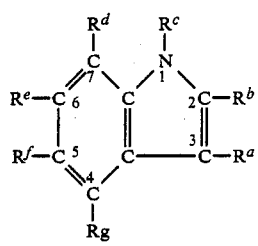

Formula XXI.

wherein each $R^a$, $R^b$, $R^c$, $R^d$, $R^e$, $R^f$ and $R^g$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substitutent. Suitable indole compounds which can be employed herein include, for example, indole, 1-methylindole, 2-methylindole, 3-butylindole, 1-methyl-2-propylindole, 2-ethyl-3-methylindole, 1-(3-hydroxypropyl)indole, 2-phenylindole, 1-benzylindole, 2-phenyl-1-methylindole, 2-cyanoindole, 5-chloroindole, 3-bromo-1-methylindole, any combination thereof and the like.

Suitable indolizine compounds which can be employed herein include, for example, those represented by the following formula XXII

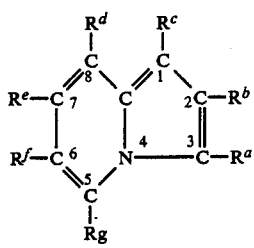

Formula XXII.

wherein each $R^a$, $R^b$, $R^c$, $R^d$, $R^e$, $R^f$ and $R^g$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substitutent. Suitable indolizine compounds include, for example, indolazine, 1-methylindolizine, 2-methylindolizine, 3-butylindolizine, 5-methyl-1-propylindolizine, 2-ethyl-1-methylindolizine, 6-(3-hydroxypropyl)indolizine, 3-phenylindolizine, 7-benzylindolizine, 2-phenyl-3-methylindolizine, 5-cyanoindolizine, 7-chloroindolizine, 3-bromo-5-methylindolizine, any combination thereof and the like.

Suitable phenazine compounds which can be employed herein include, for example, those represented by the following formula XXIII

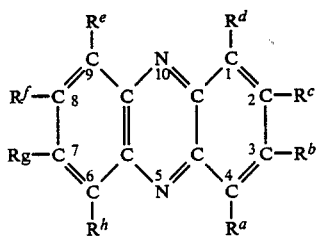

Formula XXIII.

wherein each $R^a$, $R^b$, $R^c$, $R^d$, $R^e$, $R^f$, $R^g$ and $R^h$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substitutent. Suitable phenazine compounds which can be employed herein include, for example, phenazine, 1-methylphenazine, 2-methylphenazine, 2-butylphenazine, 1-methyl-7-propylphenazine, 1-ethyl-4-methylphenazine, 2-(3-hydroxypropyl)phenazine, 1-phenylphenazine, 1-benzylphenazine, 1-phenyl-7-methylphenazine, 2-cyanophenazine, 1-chlorophenazine, 1-bromo-2-methylphenazine, any combination thereof and the like.

Suitable phenarsazine compounds which can be employed herein include, for example, those represented by the following formula XXIV

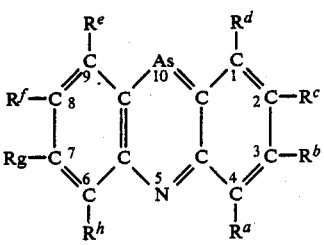

Formula XXIV.

wherein each $R^a$, $R^b$, $R^c$, $R^d$, $R^e$, $R^f$, $R^g$ and $R^h$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substitutent. Suitable phenarsazine compounds which can be employed herein include, for example, phenarsazine, 1-methylphenarsazine, 2-methylphenarsazine, 4-butylphenarsazine, 1-methyl-6-propylphenarsazine, 2-ethyl-3-methylphenarsazine, 1-(3-hydroxypropyl)phenarsazine, 4-phenylphenarsazine, 3-benzylphenarsazine, 2-phenyl-7-methylphenarsazine, 3-cyanophenarsazine, 1-chlorophenarsazine, 1-bromo-8-methylphenarsazine, any combination thereof and the like.

Suitable phenothiazine compounds can be employed herein include, for example, those represented by the following formula XXV

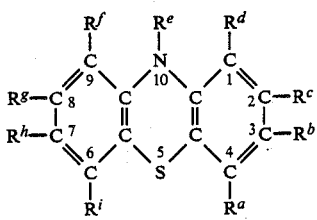

Formula XXV.

wherein each $R^a$, $R^b$, $R^c$, $R^d$, $R^e$, $R^f$, $R^g$, $R^h$ and $R^i$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substitutent. Suitable phenothiazine compounds include, for example, phenothiazine, 10-methylphenothiazine, 1-methylphenothiazine, 2-butylphenothiazine, 10-methyl-4-propylphenothiazine, 2-ethyl-3-methylphenothiazine, 4-(3-hydroxypropyl)phenothiazine, 10-phenylphenothiazine, 1-benzylphenothiazine, 10-phenyl-4-methylphenothiazine, 7-cyanophenothiazine, 4-chlorophenothiazine, 4-bromo-10-methylphenothiazine, any combination thereof and the like.

Suitable pyrroline compounds which can be employed herein include, for example, those represented by the following formula XXVI

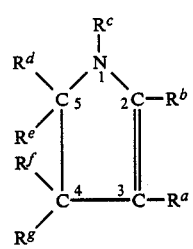

Formula XXVI.

wherein each $R^a$, $R^b$, $R^c$, $R^d$, $R^e$, $R^f$ and $R^g$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substitutent. Suitable pyrroline compounds include, for example, pyrroline, 2-methylpyrroline, 4-methyl-pyrroline, 5-butylpyrroline, 5-methyl-1-propyl-pyrroline, 1-ethyl-3-methylpyrroline, 1-(3-hydroxy-propyl)pyrroline, 5-phenylpyrroline, 1-benzylpyrroline, 1-phenyl-4-methyl-pyrroline, 3-cyanopyrroline, 5-chloropyrroline, 2-bromo-1-methylpyrroline, any combination thereof and the like.

Suitable indoline compounds which can be employed herein include, for example, those represented by the following formula XXVII

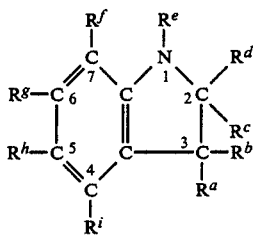

Formula XXVII.

wherein each $R^a$, $R^b$, $R^c$, $R^d$, $R^e$, $R^f$, $R^g$, $R^h$ and $R^i$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable indoline compounds include, for example, indoline, 1-methylindoline, 2-methylindoline, 3-butylindoline, 1-methyl-2-propylindoline, 2-ethyl-2-methylindoline, 1-(3-hydroxypropyl)indoline, 1-phenylindoline, 1-benzylindoline, 1-phenyl-2-methylindoline, 1-benzylindoline, 1-phenyl-2-methylindoline, 5-cyanoindoline, 7-chloroindoline, 5-bromo-1-methylindoline, any combination thereof and the like.

. Suitable piperidine compounds which can be employed herein include, for example, those represented by the following formula XXVIII

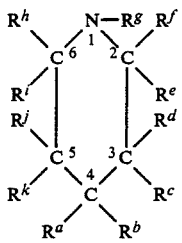

Formula XXVIII.

wherein each $R^a$, $R^b$, $R^c$, $R^d$, $R^e$, $R^f$, $R^g$, $R^h$, $R^i$, $R^j$ and $R^k$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substitutent,. Suitable piperidine compounds which can be employed herein include, for example, piperidine, 1-methylpiperidine, 2-methylpiperidine, 3-butylpiperidine, 1-methyl-2-propypiperidine, 2-ethyl-4-methylpiperidine, 1-(3-hydroxypropyl)piperdine, 1-phenylpiperidine, 1-benzylpiperidine, 1-phenyl-2-methylpiperidine, 4-cyanopiperdine, 3-chloropiperidine, 4-bromo-1-methylpiperidine, any combination thereof and the like.

Suitable piperazine compounds which can be employed herein include, for example, those represented by the following formula XXIX

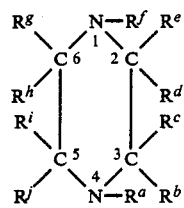

Formula XXIX.

wherein each $R^a$, $R^b$, $R^c$, $R^d$, $R^e$, $R^f$, $R^g$, $R^h$, $R^i$ and $R^j$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable piperazine compounds which can be employed herein include, for example, piperazine, 1-methylpiperazine, 2-methylpiperazine, 3-butylpiperazine, 1-methyl-4-propylpiperazine, 1-ethyl-3-methylpiperazine, 1(3-hydroxypropyl)-piperazine, 2-phenylpiperazine, 1-benzylpiperazine, 1-methyl-3-phenylpiperazine, 2-cyanopiperazine, 2-chloropiperazine, 1,4-dimethyl-2-bromopiperazine, any combination thereof and the like.

Particularly suitable inorganic acids having a weak nucleophilic anion include, for example, fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid and any combination thereof and the like. Most particularly suitable such acid is fluoboric acid.

Fluoboric acid is sometimes referred to as fluoroboric acid or hydrogen tetrafluoroborate. Any of these expressions refer to the chemical represented by the formula, $HBF_4$.

Suitable metal salts of inorganic acids free from any organic substituents and having a weak nucleophilic anion include, for example those sets of metals of Groups I and II of the Periodic Table of the Elements published by Sargent-Welch Scientific Company as catalog number S-18806. Particularly such salts include, for example, the sodium, potassium, lithium, calcium, barium, magnesium and silver salts of such inorganic acids.

Suitable compounds having an average of more than one epoxide group per molecule which can be employed herein include, epoxy resins such as, for example, the glycidyl ethers of polyhydric phenols such as dihydroxy phenols, biphenols, bisphenols, halogenated bisphenols, alkylated bisphenols, trisphenols, phenol-aldehyde novolac resins, substituted phenol-aldehyde novolac resins, phenol-hydrocarbon resins, substituted phenol-hydrocarbon resins, any combination thereof and the like. Suitable such epoxy resins include, for example, those represented by the following formulas XXX-XXXIV

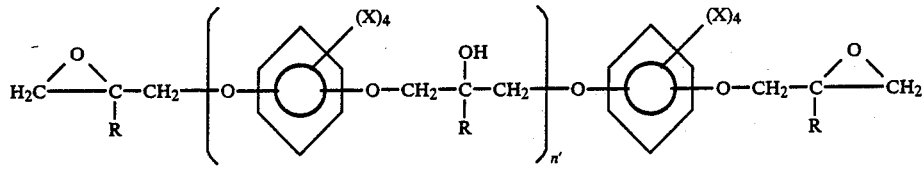

Formula XXX.

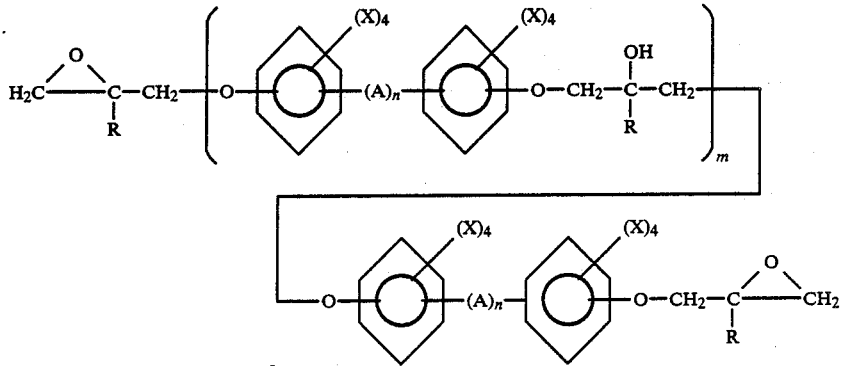

Formula XXXI.

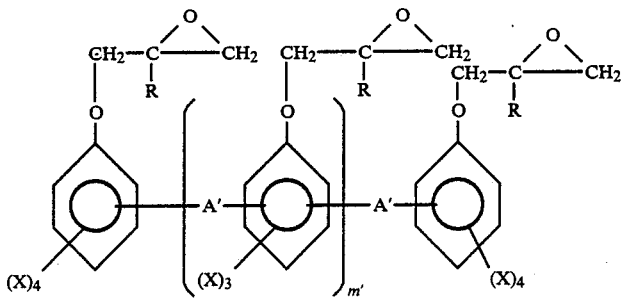

Formula XXXII.

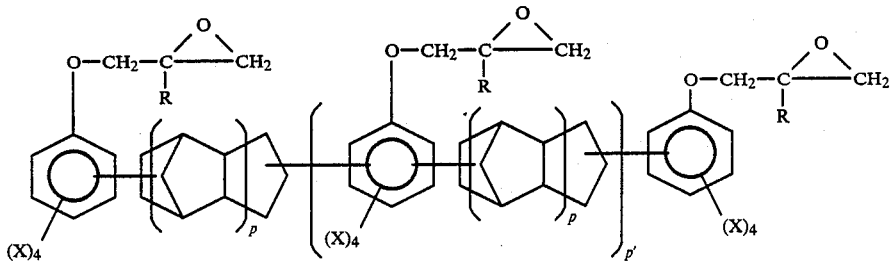

Formula XXXIII.

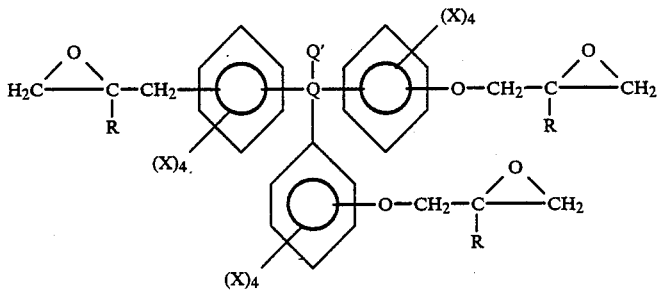

Formula XXXIV.

wherein each A is independently a divalent hydrocarbyl group having from 1 to about 9, preferably from 1 to about 4, carbon atoms, —O—, —S—, —S—S—, —SO—, —SO$_2$—, or —CO—; each A' is independently a divalent hydrocarbyl group having from 1 to about 9, preferably from 1 to about 4 carbon atoms; Q is a hydrocarbyl group having from 1 to about 10 carbon atoms; Q' is hydrogen, halogen, cyano or an alkyl group having from 1 to about 4 carbon atoms; each R is independently hydrogen, halogen, cyano or an alkyl group having from 1 to about 4 carbon atoms; each X is independently hydrogen, bromine, chlorine, or a hydrocarbyl or hydrocarbyloxy group having from 1 to about 9, preferably from 1 to about 4 carbon atoms; m has an average value from zero to about 12, preferably from about zero to about 9, most preferably from about 0.03 to about 3; m' has an average value from about 0.01 to about 8, preferably from about 0.2 to about 6, more preferably from about 0.5 to about 4; n has a value of zero or 1; n' has an average value of from zero to about 12, preferably from zero to about 9, most preferably from about 0.03 to about 3; each p suitably has a value from zero to about 10, more suitably from zero to about 6, most suitably from about 1 to about 3; and each p' suitably has a value from zero to about 8, more suitably from about 1 to about 6, most suitably from about 2 to about 4. Also suitable are the oligomers of the epoxy resin represented by formula XXXIV.

The term hydrocarbyl as employed herein means any aliphatic, cycloaliphatic, aromatic, aryl substituted aliphatic or cycloaliphatic, or aliphatic or cycloaliphatic substituted aromatic groups. The aliphatic groups can be saturated or unsaturated. Likewise, the term hydrocarbyloxy means a hydrocarbyl group having an oxygen linkage between it and the carbon atom to which it is attached.

Particularly suitable such epoxy resins include, for example, the diglycidyl ethers of resorcinol, catechol, hydroquinone, biphenol, bisphenol A, bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicylopentadiene-phenol resins, dicyclopentadiene-substituted phenol resins tetramethylbiphenol, tetramethyl-tetrabromobiphenol, tetramethyltribromobiphenol, tetrachlorobisphenol A, any combination thereof and the like.

Also suitable as the epoxide compound which can be employed in the present invention include those partially advanced epoxy resins disclosed by Bertram et al. in U.S. Pat. No. 4,594,291 which is incorporated herein by reference.

Also suitable as the epoxide compound are the glycidyl ethers of compounds having an average of more than one aliphatic hydroxyl group per molecule such as, for example, aliphatic diols, polyether diols, polyether triols, polyether tetrols, any combination thereof and the like. Also suitable are the alkylene oxide adducts of compounds containing an average of more than one aromatic hydroxyl group per molecule such as, for example, the ethylene oxide, propylene oxide, or butylene oxide adducts of dihydroxy phenols, biphenols, bisphenols, halogenated bisphenols, alkylated bisphenols, trisphenols, phenol-aldehyde novolac resins, halogenated phenol-aldehyde novolac resins, alkylated phenol-aldehyde novolac resins, hydrocarbon-phenol resins, hydrocarbon-halogenated phenol resins, or hydrocarbon-alkylated phenol resins, or any combination thereof and the like.

Suitable aromatic hydroxyl containing compounds which can be employed herein include, for example, compounds having an average of more than one phenolic hydroxyl group per molecule. Suitable such compounds include, for example, dihydroxy phenols, biphenols, bisphenols, halogenated bisphenols, alkylated bisphenols, trisphenols, phenol-aldehyde resins, halogenated phenol-aldehyde novolac resins, alkylated phenol-aldehyde novolac resins, phenolhydroxybenzaldehyde resins, alkylated phenolhydroxybenzaldehyde resins, hydrocarbon-phenol resins, hydrocarbon-halogenated phenol resins, hydrocarbon-alkylated phenol resins, any combination thereof and the like. Particularly suitable aromatic hydroxyl containing compounds include, for example, those represented by the following formulas XXXV–XXXVIII

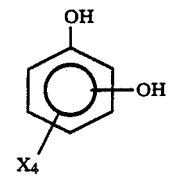

Formula XXXV.

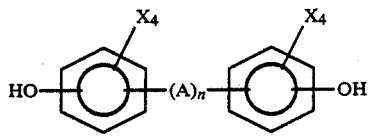

Formula XXXVI.

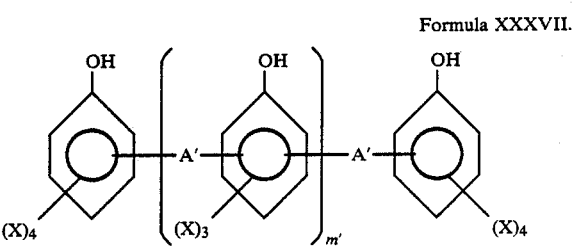

Formula XXXVII.

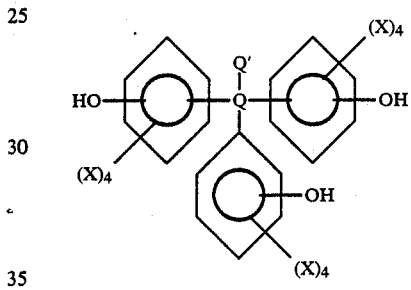

Formula XXXVIII.

wherein A, A', Q, Q' X, n and m are as defined above in formulas XII–XVI. Particularly suitable aromatic hydroxyl-containing materials include, for example, biphenol, bisphenol A, bisphenol K, tetrabromobisphenol A, tetrabromobisphenol K, resorcinol, phenol-aldehyde novolac resins, cresol-aldehyde novolac resins, phenol-hydroxybenzaldehyde resins, cresol-hydroxybenzaldehyde resins, tetramethylbiphenol, tetramethyltribromobiphenol, tetramethyltetrabromobiphenol, tetrachorobisphenol A, any combination thereof and the like. Also suitable are the oligomers of the multifunctional phenolic compounds represented by the formula X.

These and other suitable aromatic hydroxyl-containing compounds are disclosed in U.S. Pat. No. 4,594,291 issued Jun. 10, 1986 by Bertram et al which is incorporated herein by reference in its entirety.

The aromatic hydroxyl-containing compounds are employed in amounts which provide a ratio of aromatic hydroxyl groups to epoxy groups suitably from about 0.05:1 to about 20:1, more suitably from about 0.1:1 to about 10:1, most suitably from about 0.2:1 to about 5:1.

The precatalyzed compositions of the present invention can contain, if desired, pigments, fillers, dyes, diluents, solvents, stabilizers, epoxy resin curing agents, any combination thereof and the like.

Suitable stabilizer materials and curing agents which can be employed herein include, for example, those disclosed in the aforementioned U.S. Pat. No. 4,594,291 by Bertram et al which is incorporated herein by reference in its entirety.

The compositions of the present invention are useful in the preparation of formulations for use in the preparation of electrical and structural laminates and composites, coatings, castings, moldings, encapsulants and the like. They can be employed in the conventional methods or the newer reaction transfer molding (RTM) and reaction injection molding (RIM) techniques.

The following examples are illustrative of the invention but are not to be construed as to limiting the scope thereof in any manner.

EXAMPLE 1

PREPARATION OF 2-METHYLIMIDAZOLIUM FLUOBORATE COMPLEX

A glass flask fitted with a stirrer, thermometer, and reflux condenser is charged with 15.37 grams (0.098 mole) of a 55.9% aqueous solution by weight, of fluoboric acid. To this stirred solution, 8.2 grams (0.100 mole) of 2-methylimidazole are slowly added during about five minutes. The heat from the reaction warmed the solution to approximately 50° C. as the 2-methylimidazole dissolves. The solution is stirred for an additional 30 minutes as it cools to near ambient temperature. Methanol is then added, 19.98 grams, to dilute the solution to 38.6% solids based on the weight of the 2-methylimidazole and fluoboric acid.

The concentration of the aqueous fluoboric acid was determined by potentiometric titration to the first inflection point with 0.100N potassium hydroxide in methanol. An MCI GT-05 automatic titrator and a combination silver/silver chloride electrode (Curtain Matheson Scientific No. 201-947) were used to measure the pH changes during the course of the titration.

EXAMPLES 2-12

PREPARATION OF 2-METHYLIMIDAZOLIUM FLUOBORATE COMPLEXES

The procedure described in Example 1 is repeated using the same procedure and amount of 2-methylimidazole (2-MI), however the weight of fluoboric acid (55.9% aqueous solution) is varied as shown in Table I. All experiments are diluted with methanol to 38.5% solids based on the combined weights of 2-MI and fluoboric acid. The results are given in Table I.

TABLE I

2-METHYLIMIDAZOLE WITH VARYING RATIOS OF FLUOBORIC ACID

| Example Number | Fluoboric Acid Solution (grams) | Moles of Fluoboric Acid Per Mole of 2-MI |
|---|---|---|
| 2 | 11.71 | 0.75 |
| 3 | 13.17 | 0.84 |
| 4 | 13.90 | 0.89 |
| 5 | 14.63 | 0.93 |
| 1 | 15.37 | 0.98 |
| 6 | 16.10 | 1.03 |
| 7 | 16.83 | 1.07 |
| 8 | 17.56 | 1.12 |
| 9 | 17.88 | 1.14 |
| 10 | 18.35 | 1.17 |
| 11 | 20.39 | 1.30 |
| 12 | 21.17 | 1.35 |

EXAMPLE 13

PREPARATION OF 2-PHENYLIMIDAZOLIUM FLUOBORATE

A glass flask fitted with a stirrer, thermometer, and a reflux condenser is charged with 15.37 grams (0.098 mole) of a 55.9% aqueous solution, by weight, of fluoboric acid and 29.3 grams of methanol. To this stirred solution, 14.4 grams (0.100 mole) of 2-phenylimidazole (2-PI) are slowly added during about five minutes. The heat from the reaction warms the solution to approximately 50° C. as the 2-phenylimidazole dissolves. The solution is stirred for an additional 30 minutes as it cools to near ambient. The product is a clear solution containing 38.9% by weight of the 2-phenylimidazolium fluoborate adduct/complex.

EXAMPLE 14

PREPARATION OF 4-METHYLIMIDAZOLIUM FLUOBORATE COMPLEX

The procedure of Example 13 is followed using the following reagents:
4.00 g (0.0487 mole) of 4-methylimidazole (4-MI)
7.84 g (0.0500 mole) of fluoboric acid (55.9% aqueous)
9.92 g of methanol
The resultant product is a clear solution containing 38.5% by weight of the 4-methylimidazolium fluoborate adduct/complex.

EXAMPLE 15

PREPARATION OF 1,2-DIMETHYLIMIDAZOLIUM FLUOBORATE COMPLEX

The procedure of Example 13 is followed using the following reagents:
4.68 g (0.0487 mole) of 1,2-dimethylimidazole (1,2-DMI)
7.84 g (0.0500 mole) of fluoboric acid (55.9% aqueous)
10.95 g of methanol
The resultant product is a clear solution containing 38.6% by weight of the 1,2-dimethylimidazolium fluoborate adduct/complex.

EXAMPLE 16

PREPARATION OF 2-ETHYL-4-METHYLIMIDAZOLIUM FLUOBORATE COMPLEX

The procedure of Example 13 is followed using the following reagents:
5.36 g (0.0487 mole) of 2-ethyl-4-methylimidazole (2-E-4-MI)
7.84 g (0.0500 mole) of fluoboric acid (55.9% aqueous)
11.98 g of methanol
The resultant product is a clear solution containing 38.7% by weight of the 2-ethyl-4-methylimidazolium fluoborate adduct/complex.

EXAMPLE 17

Preparation of 4,5-Diphenylimidazolium Fluoborate Complex

The procedure of Example 13 is followed using the following reagents:
4.00 g (0.0182 mole) of 4,5-diphenylimidazole (4,5-DPI)
2.92 g (0.0166 mole) of fluoboric acid (55.9% aqueous)
7.47 g of methanol After the above reactants are added together, the mixture is not homogeneous, therefore an additional 35.4 grams of the monomethyl ether of propylene glycol monoacetate is added to give a clear solution containing 11.3% by weight of the 4,5-diphenylimidazolium fluoborate adduct/complex.

EXAMPLE 18-34

Imidazolium Fluoborate Complex Catalyzed Epoxy/Phenolic Systems

The catalysts described in Examples 1-17 are mixed with a 1:1 molar ratio of a diglycidyl ether of bisphenol A having an epoxy equivalent weight of 181.5 (D.E.R. ™ 383 Epoxy Resin commercially available from The Dow Chemical Co.) and bisphenol A (2,2-bis(4,4'-hydroxyphenyl)propane), commercially available from The Dow Chemical Co. as PARABIS ™ ) dissolved in the monomethylether of propylene glycol monoacetate (PMA). The epoxy resin (181.5 grams, 1 equiv.), bisphenol A (114 grams, 1 equiv.) and 73.88 grams of PMA are heated between 80° C. and 100° C. under a nitrogen atmosphere until homogeneous, cooled to ambient temperature and the appropriate amount of catalyst added as described in Table II. Portions of these solutions are then stored at 50° C. and the 25° C. viscosity monitored as shown in Table III.

TABLE II

CATALYZED EPOXY/PHENOLIC FORMULATIONS

| Example or Comp. Expt. No. | Catalyst (Ex. Number) | Catalyst Solution Weight (grams) | Millimoles of Catalyst per Equivalent of Epoxide |
|---|---|---|---|
| 18 | 1 | 3.92 | 9.0 |
| 19 | 2 | 3.47 | 9.0 |
| 20 | 3 | 3.67 | 9.0 |
| 21 | 4 | 3.75 | 9.0 |
| 22 | 5 | 3.82 | 9.0 |
| 23 | 6 | 4.02 | 9.0 |
| 24 | 7 | 4.12 | 9.0 |
| 25 | 8 | 4.22 | 9.0 |
| 26 | 9 | 4.24 | 9.0 |
| 27* | 10 | 4.31 | 9.0 |
| 28* | 11 | 4.59 | 9.0 |
| 29* | 12 | 4.67 | 9.0 |
| 30 | 13 | 5.31 | 9.0 |
| 31 | 14 | 4.00 | 9.0 |
| 32 | 15 | 4.33 | 9.0 |
| 33 | 16 | 4.65 | 9.0 |
| 34 | 17 | 24.65 | 9.0 |
| C. E.$^a$A* | No Cat. | — | — |
| C. E.$^a$B* | 2-MI$^b$ | 1.85 | 9.0 |
| C. E.$^a$C* | 2-PI$^c$ | 3.24 | 9.0 |
| C. E.$^a$D* | 1,2-DMI$^d$ | 2.16 | 9.0 |

*Not an example of the present invention.
$^a$C. E. is Comparative Experiment.
$^b$2-methyl imidazole alone as catalyst. (40% by wt. solution in methanol)
$^c$2-phenylimidazole alone as catalyst. (40% by wt. solution in methanol)
$^d$1,2-dimethylimidazole alone as catalyst. (40% by wt. solution in methanol)

TABLE III

50° C. Stability Study

| Ex. or CE$^a$ | Nitrogen or Phosphorus Cont. Compound | Mol. of HBF$_4$ per Mol. of N-Cont. Cmpd. | Initial Cps | Initial Pa.s | After 1 Day Cps | After 1 Day Pa.s | After 14 Days Cps | After 14 Days Pa.s | % of Control Viscosity$^d$ After 1 Day | % of Control Viscosity$^d$ After 14 Days |
|---|---|---|---|---|---|---|---|---|---|---|
| 18 | 2-MI | 0.98 | 885 | .885 | 1054 | 1.054 | 1385 | 1.385 | 10.5 | <0.7 |
| 19 | 2-MI | 0.75 | 914 | .914 | 1361 | 1.361 | N.D. | N.D. | 13.6 | N.D. |
| 20 | 2-MI | 0.84 | 904 | .904 | 1211 | 1.211 | 24150 | 24.150 | 12.1 | <12.1 |
| 21 | 2-MI | 0.89 | 891 | .891 | 1144 | 1.144 | 8890 | 8.890 | 11.4 | <4.4 |
| 22 | 2-MI | 0.93 | 887 | .887 | 1085 | 1.085 | 3120 | 3.120 | 10.8 | <1.6 |
| 23 | 2-MI | 1.03 | 877 | .887 | 1032 | 1.032 | 1251 | 1.251 | 10.3 | <0.6 |
| 24 | 2-MI | 1.07 | 840 | .840 | 957 | .957 | 1168 | 1.168 | 9.6 | <0.6 |
| 25 | 2-MI | 1.12 | 836 | .836 | 987 | .987 | 2919 | 2.919 | 9.9 | <1.5 |
| 26* | 2-MI | 1.14 | 1360 | 1.360 | >200,000$^b$ | >200$^b$ | N.D. | N.D. | N/A | N.D. |
| 27* | 2-MI | 1.17 | 1243 | 1.243 | >200,000$^b$ | >200$^b$ | — | — | >1999 | — |
| 28* | 2-MI | 1.30 | 1715 | 1.715 | >200,000$^b$ | >200$^b$ | — | — | >1999 | — |
| 29* | 2-MI | 1.35 | 2000$^e$ | 2.000$^e$ | >200,000$^b$ | >200$^b$ | — | — | >1999 | — |
| 30 | 2-PI | 0.98 | 820 | .820 | 980 | .980 | 1404 | 1.404 | 7.0 | — |
| 31 | 4-MI | 1.02 | 867 | .867 | 1020 | 1.020 | 1179 | 1.179 | — | — |
| 32 | 1,2-DMI | 1.03 | 836 | .836 | 932 | .932 | 1260 | 1.260 | 7.6 | <0.6 |
| 33 | 2-E-4-MI | 1.02 | 828 | .828 | 897 | .897 | 1140 | 1.140 | — | — |
| 34 | 4,5-DPI | 1.03 | 417 | .417 | 576 | .576 | 742 | .742 | — | — |
| A* | None | 0 | 1079 | 1.079 | 1081 | 1.081 | 1256 | 1.256 | — | — |
| B* | 2-MI$^c$ | 0 | 1006 | 1.006 | 10,006 | 10.006 | >200,000$^b$ | >200$^b$ | — | — |
| C* | 2-PI$^c$ | 0 | 1042 | 1.042 | 14,000 | 14.000 | — | — | — | — |
| D* | 1,2-DMI$^c$ | 0 | 1171 | 1.171 | 12,228 | 12.228 | >200,000$^b$ | >200$^b$ | — | — |

FOOTNOTES TO TABLE III
*Not an example of the present invention.
$^a$Examples are designated by numerals whereas comparative experiments are designated by letters.
$^b$Viscosity of the composition exceeded the test method (>200,000 cps).
$^c$2-Methylimidazole, 2-phenylimidazole and 1,2-dimethylimidazole employed alone as catalyst.
$^d$This value is determined by dividing the viscosity obtained in the appropriate example by the viscosity of a comparable formulation employing as the catalyst the same nitrogen or phosphorus compound except that it has not been reacted with HBF$_4$.
$^e$The viscosity was increasing during measurement.

EXAMPLE 35

Coating Properties with 2-Methyl-Imidazolium Fluoborate Catalyst

The formulations described in Example 18 and Comparative Experiment B are applied to 24 gauge Bonderite ™ R 90 treated steel panels available from Parker Chemical Co. via a wire wound steel draw down rod. The coatings are allowed to air dry for approximately five minutes, then placed in a forced air oven preset at 200° C. for 10 minutes. The panels are removed from the oven, cooled to ambient temperature, and tested as shown in Table IV.

Resistance to methyl ethyl ketone is determined in the following manner. The ball end of a ball peen hammer weighing about 1.5 lbs. (0.6804 kg) is covered with 8 plys of gauze, which is then wet with methyl ethyl ketone (MEK). The ball end of the hammer is applied to the coated surface and rubbed back and forth until the coating is removed. One double rub corresponds to one back and forth movement of the hammer. The number of double rubs required to remove or mar the coating is recorded.

Flexibility is determined by a ⅛ in. wedge test using a Gardner Falling Dart Impact Tester (available from the Gardner Laboratory, Inc., Bethesda, Md.) configured for 0 to ⅛ in. (0 to 3.175 mm) wedge bend test. The bottom ¾ in. (19.05 mm) of the panel is bent 180° over itself, exposing the coating to the outer surface, then sandwiched between two nonparallel steel plates that are hinged such that when completely together, they form a zero to ⅛ in. (0 to 3.175 mm) gap. The top plate is then impacted with the blunt end of the falling dart until the panel is bent from a zero to ⅛ in. (0 to 3.175 mm) wedge. The coated area over the bend is then wiped for approximately one minute with a 10% CuSO$_4$/1N HCl solution which turns a copper-red color where the coating has failed and exposed steel metal. The percent pass value given in Table IV is calculated as the number of inches from the ⅛ in. (0 to 3.175 mm) end to the point of failure, as evidenced by the copper-red color, divided by the total 4 in. (101.6 mm) total length times 100.

TABLE IV

COATING PROPERTIES OF CATALYZED SYSTEMS

| SAMPLE NUMBER | FORMULATIONS FROM EXAMPLE OR COMP. EXPT. | MEK DOUBLE RUBS | GARDNER IMPACT in.-lbs. | GARDNER IMPACT J | ⅛ in. WEDGE BEND % Pass |
|---|---|---|---|---|---|
| I | 18 | 30–50 | >180 | >20.34 | 100 |
| II* | C.E.$^a$B | >100 | >180 | >20.34 | 100 |

*Not an example of the present invention.
$^a$C.E. is Comparative Experiment.

EXAMPLE 36

Clear Casting Properties with Imidazolium Fluoborate Catalyst

Tetrabromobisphenol A 136 grams (0.5 equivalents), 181.5 grams (1.0 equivalent) of D.E.R. ™ 383, 4.3 grams (0.1 equivalent) of sulfanilamide, 24.8 grams (0.4 equivalents) are stirred at 100° C.-130° C. until homogeneous, then 0.871 grams (2.0 millimoles) of the catalyst described in Example 1 is added. The mixture is stirred until homogeneous, degassed via evacuation for approximately one minute, then poured into preheated aluminum molds spaced ⅛ inch apart. The castings are cured for 16 hours at 150° C., followed by three hours at 200° C. The casting is then cooled and removed from the aluminum mold for testing as shown in Table V, Example 36.

EXAMPLE 37

Clear Casting Properties with Tetrabutylphosphonium Fluoborate Catalyst

Example 36 is repeated using 1.84 g (2.0 millimoles) of the catalyst described in Example 52. The testing results are shown in Table V, Example 37.

In these experiments, toughness is reported as the stress intensification factor, $K_q$. The method for measuring $K_q$ is an adaptation of ASTM E 399-83 for plastics materials from the original usage with metals. The compact tension test is now widespread in usage and is described in the J. Mater. Sci., Vol., 16, 2657, 1981. An individual test piece is cut as an approximate 1 inch (25.4 mm) square from a flat casting usually of ⅛ inch (3.175 mm) thickness. A dovetail notch is cut into one edge, centered, about ¼ inch (6.25 mm) in depth. Next, a razor blade is inserted into this notch and tapped to produce a precrack. Tow holes are then drilled adjacent to the dovetail as indicated in ASTM E 399-83, allowing the test piece to be pinned into position in the Instron test machine. Extension of the sample now allows the force required to propagate opening of the precrack to be measured, using a test speed of 0.02 inches/minute (0.0085 mm/sec.). This force is used in the equation given in ASTM E-399, along with the required sample dimensions and actual precrack length, to calculate a "stress intensification factor", $K_Q$. This method is described by Lee, L. H. in Physicochemical Aspects of Polymer Surfaces, K. L. Mittal, ed., Plenum Press, New York, N.Y., 1983.

In these experiments, glass transition temperature (Tg) is measured by differential scanning calorimetry (DSC) using a calibrated DuPont Instrument (Model No. 912 with a 1090 controller). Samples are run under a nitrogen atmosphere with a temperature ramp of 10° C. per minute (0.1667° C./sec.).

TABLE V

CLEAR CASTING PROPERTIES OF CURED RESIN COMPOSITIONS

| EXAMPLE NUMBER | CATALYST FROM EXAMPLE OR COMP. EXPT. * | Glass Trans. Temp. °C. | Toughness $K_q$ psi × in$^{0.5}$ | Toughness $K_q$ MPa.M$^{0.5}$ |
|---|---|---|---|---|
| 36 | 1 | 154 | 890 | 0.979 |
| 37 | 52 | 145 | 990 | 1.089 |

EXAMPLE 38

Preparation of Ethyltriphenylphosphonium Fluoborate Complex

A glass flask fitted with a stirrer, thermometer, and reflux condenser is charged with 11.4 grams of a 71.9% methanol solution, by weight, of ethyltriphenylphosphonium acetate·acetic acid (ETPPA·HAc) complex (0.0200 moles). To this stirred solution, 3.682 grams (0.0224 moles) of a 53.4% by weight aqueous solution of fluoboric acid (1.12 moles per mole of ETPPA·HAc) are slowly added during about five minutes. The heat from the reaction warms the solution to approximately 50° C. The solution is stirred for an additional 30 minutes as it cooled to near ambient temperature. Methanol is then added, 10.22 grams, to dilute the solution to 40% solids based on the weight of the ethyltriphenylphosphonium fluoborate complex.

The weight percent of ETTPA·HAc in methanol was determined by titration of the acetate group with 0.1006N perchloric acid (HClO$_4$) in acetic acid to a crystal violet endpoint (blue to green endpoint). It required 12.80 ml (0.001280 moles) of perchloric acid solution to titrate 0.7295 g of ETPPA·HAc/methanol solution dissolved in 15 ml of dichloromethane, which calculates to 71.9 wt. % of ETPPA·HAc in methanol.

EXAMPLES 39-45

Preparation of Ethyltriphenylphosphonium Fluoborate Complexes

The procedure described in Example 38 is repeated using the same procedure and amount of ETPPA·HAc, however the weight of fluoboric acid (53.4% aqueous solution) is varied as shown in Table IV. All experiments are diluted with methanol to 40% solids based on the combined weights of ETPPA·HAc and fluoboric acid.

TABLE IV

ETHYLTRIPHENYLPHOSPHONIUM FLUOBORATE COMPLEXES WITH VARYING RATIOS OF FLUOBORIC ACID

| EXAMPLE NUMBER | FLUOBORIC ACID SOL. (grams) | MOLES FLUOBORIC ACID PER MOLE OF ETPPA.HAc |
|---|---|---|
| 39 | 3.123 | 0.95 |
| 40 | 3.353 | 1.02 |
| 41 | 3.517 | 1.07 |
| 38 | 3.682 | 1.12 |
| 42 | 3.876 | 1.17 |
| 43 | 4.010 | 1.22 |
| 44 | 4.175 | 1.27 |
| 45 | 4.339 | 1.32 |
| C.E.$^a$E* | 0.0$^b$ | 0.0 |

*Not an example of the present invention.
$^a$C.E. is Comparative Experiment.
$^b$Ethyltriphenylphosphonium acetate.acetic acid complex alone as catalyst.

EXAMPLE 46

Preparation of Tetrabutylphosphonium Fluoborate Complex

A glass flask fitted with a stirrer, thermometer, and reflux condenser is charged with 6.20 grams (0.01 moles) of a 60.9% methanol solution, by weight, of tetrabutylphosphonium acetate·acetic acid complex (TBPA·HAc). To this stirred solution, 2.00 grams (0.0122 moles) of a 53.4% by weight aqueous solution of fluoboric acid (1.22 moles per mole of TBPA·HAc) are slowly added during about five minutes. The heat from the reaction warms the solution to approximately 50° C. The solution is stirred for an additional 30 minutes as it cooled to near ambient temperature. Methanol is then added, 3.916 grams, to dilute the solution to 40% solids based on the weight of the tetrabutylphosphonium fluoborate complex.

The weight percent of TBPA·HAc in methanol was determined by titration of the acetate group with 0.1006N perchloric acid (HClO$_4$) in acetic acid to a crystal violet endpoint (blue to green endpoint). It required 10.15 ml (0.001015 moles) of perchloric acid solution to titrate 0.6301 g of TBPA·HAc/methanol dissolved in 15 ml of dichloromethane, which calculates to 60.9 wt. % TBPA·HAc in methanol.

EXAMPLES 47-54

Preparation of Tetrabutylphosphonium Fluoborate Complexes

The procedure described in Example 46 is repeated using the same procedure and amount of tetrabutylphosphonium acetate·acetic acid complex (TBPA·HAc), however the weight of fluoboric acid (53.42% aqueous solution) is varied as shown in Table V. All experiments were diluted with methanol to 40% solids based on the combined weights of TBPA·HAc and fluoboric acid.

TABLE V

TETRABUTYLPHOSPHONIUM FLUOBORATE COMPLEXES WITH VARYING RATIOS OF FLUOBORIC ACID

| EXAMPLE NUMBER | FLUOBORIC ACID SOL. (grams) | MOLES FLUOBORIC ACID PER MOLE OF TBPA.HAc |
|---|---|---|
| 47 | 1.56 | 0.95 |
| 48 | 1.67 | 1.02 |
| 49 | 1.759 | 1.07 |
| 50 | 1.84 | 1.12 |
| 51 | 1.923 | 1.17 |
| 46 | 2.005 | 1.22 |
| 52 | 2.05 | 1.25 |
| 53 | 2.087 | 1.27 |
| 54 | 2.17 | 1.32 |
| C.E.$^a$F* | 0.0$^b$ | 0.0 |

*Not an example of the present invention.
$^a$C.E. is Comparative Experiment.
$^b$Tetrabutylphosphonium acetate.acetic acid complex alone as catalyst.

EXAMPLES 55-63

Preparation of Other Fluoborate Complexes

The procedure of Example 38 is followed, using a ratio of 1.02 moles of fluoboric acid per equivalent of nitrogen containing compound as described in Table VI. Methanol is added to bring the percent solids based on the amine compound·fluoborate complex to 40% by weight.

TABLE VI

TETRABUTYLPHOSPHONIUM FLUOBORATE COMPLEXES WITH VARYING RATIOS OF FLUOBORIC ACID

| EXAMPLE NUMBER | NITROGEN CONTAINING COMPOUND |
|---|---|
| 55 | PYRROLIDINE |
| 56 | N-METHYLMORPHOLINE |
| 57 | MORPHOLINE |
| 58 | BUTYLAMINE |
| 59 | DIBUTYLAMINE |
| 60 | TRIBUTYLAMINE |
| 61 | DIETHYLANILINE |
| 62 | 1-METHYLPYRROLIDINE |
| 63 | PYRIDINE |

EXAMPLE 64

Fluoborate Complex Via Silver Fluoborate

Vacuum dried tetrabutylphosphonium chloride, 1.82 grams (0.0062 moles) is dissolved in 5.84 grams of methanol and added dropwise to 1.20 grams (0.0062 moles) of silver fluoborate dissolved in 3.46 grams of methanol. The suspension is stirred at 25° C. for 30 minutes, and the silver chloride removed by filtration. The tetrabutylphosphonium fluoborate solution is concentrated to 40% solids by weight via vacuum removal of the excess methanol.

EXAMPLE 65

The catalysts described in Examples 38 to 64 are mixed with a 1:1 molar ratio of a diglycidyl ether of bisphenol A having an epoxy equivalent weight of 181.5 (D.E.R. ™ 383 Epoxy Resin commercially available from The Dow Chemical Company) and bisphenol A (2,2-bis(4,4′-hy-droxyphenyl)propane, PARABIS ™ commercially available from The Dow Chemical Company) dissolved in the monomethylether of propylene glycol monoacetate (PMA). The epoxy resin (181.5 grams), bisphenol A (114 grams) and 73.88 grams of PMA are heated to 80°–100° C. under a nitrogen atmosphere until homogeneous, cooled to ambient temperature and 9.0 millimoles of catalyst added to 1.00 equivalent of epoxide in a manner that is described previously for Examples 18–34. Portions of these solutions are then stored at 50° C. and the 25° C. viscosity monitored as shown in Table VII.

TABLE VII

50° C. Stability Study

| Catalyst from Ex. or CE[a] | Phosporus Cont. Compound | Mol. of HBF$_4$ per Mol. of P Cont. Cmpd. | Viscosity Initial Cps | Pa.s | After 1 Day Cps | Pa.s | After 14 Days Cps | Pa.s | % of Control Viscosity[f] After 1 Day | After 14 Days |
|---|---|---|---|---|---|---|---|---|---|---|
| 39 | ETPPA.HAc | 0.95 | 364 | .364 | 460 | .460 | — | — | <0.2 | — |
| 40 | ETPPA.HAc | 1.02 | 366 | .366 | 408 | .408 | 13565 | 13.565 | <0.2 | <6.8 |
| 41 | ETPPA.HAc | 1.07 | 356 | .356 | 385 | .385 | 1014 | 1.014 | <0.2 | <0.5 |
| 38 | ETPPA.HAc | 1.12 | 348 | .348 | 370 | .370 | 543 | .543 | <0.2 | <0.3 |
| 42 | ETPPA.HAc | 1.17 | 348 | .348 | 391 | .391 | 623 | .623 | <0.2 | <0.3 |
| 43 | ETPPA.HAc | 1.22 | 436 | .436 | 749 | .749 | 1352 | 1.352 | <0.4 | <0.7 |
| 44 | ETPPA.HAc | 1.27 | 755 | .755 | 3204 | .3204 | — | — | <1.6 | — |
| 45 | ETPPA.HAc | 1.32 | 2211 | 2.211 | 10000 | 10.000 | — | — | <5.0 | — |
| 47 | TBPA.HAc | 0.95 | 401 | .401 | 570 | .570 | — | — | 1.2 | — |
| 48 | TBPA.HAc | 1.02 | 389 | .389 | 460 | .460 | — | — | 1.0 | — |
| 49 | TBPA.HAc | 1.07 | 383 | .383 | 444 | .444 | 24378 | 24.378 | .9 | 12.2 |
| 50 | TBPA.HAc | 1.12 | 377 | .377 | 430 | .430 | 6490 | 6.490 | .9 | 3.2 |
| 51 | TBPA.HAc | 1.17 | 387 | .387 | 407 | .407 | 733 | .733 | .9 | .4 |
| 46 | TBPA.HAc | 1.22 | 376 | .376 | 393 | .393 | 572 | .572 | .8 | .3 |
| 52 | TBPA.HAc | 1.25 | 540 | 0.540 | 1457 | 1.457 | — | — | 0.7 | — |
| 53 | TBPA.HAc | 1.27 | 385 | .385 | 462 | .462 | 841 | .841 | 1.0 | .4 |
| 54 | TBPA.HAc | 1.32 | 407 | .407 | 936 | .936 | 5900 | 5.900 | 2.0 | 3.0 |
| 55 | Pyrrolidine | 1.03 | 830 | 0.830 | 1136 | 1.136 | 1416 | 1.416 | — | — |
| 56 | N-methyl morpholine | 1.03 | 718 | 0.718 | 845 | 0.845 | 1113 | 1.113 | 3.1 | <5.6 |
| 57 | Morpholine | 1.03 | 833 | 0.833 | 997 | 0.997 | 1412 | 1.412 | — | — |
| 58 | Butyl amine | 1.03 | 720 | .720 | 889 | 0.889 | 1268 | 1.268 | — | — |
| 59 | Dibutyl amine | 1.03 | 602 | .602 | 684 | 0.684 | 1049 | 1.049 | 3.4 | .5 |
| 60 | Tributyl amine | 1.03 | 494 | .494 | 580 | 0.580 | 849 | 0.849 | — | — |
| C.E.I* | 4-Phenyl morpholine | 1.03 | 688 | .688 | >2000 g | >200 g | — | — | — | — |
| 61 | N,N-Diethyl-aniline | 1.03 | 667 | .667 | 865 | 0.865 | — | — | — | — |
| 62 | 1-Methyl pyrrolidine | 1.03 | 663 | .663 | 810 | .810 | 1193 | 1.193 | — | — |
| 63 | Pyridine | 1.03 | 733 | .733 | 884 | .884 | 1484 | 1.484 | — | — |
| C.E.[a]E* | ETPPA.HAc[b] | 0 | 1053 | 1.053 | >200,000 g | >200 | — | — | — | — |
| C.E.[a]F* | TBPA.HAc[c] | 0 | 898 | .898 | 47,577 | 47.557 | >200,000 g | >200 | — | — |
| C.E.[a]G* | Dibutylamine[d] | 0 | 1169 | 1.169 | 20,328 | 20.328 | >200,000 g | >200 | — | — |
| C.E.[a]H* | N-Methyl-morpholine[e] | 0 | 1330 | 1.330 | 26,999 | 26.999 | >200,000 g | >200 | — | — |

*Not an example of the present invention.
[a]Examples are designated by numerals whereas comparative experiments are disignated by letters.
[b]Ethyltriphenylphosphonium acetate.acetic acid complex employed alone as catalyst.
[c]Tetrabutylphosphonium acetate.acetic acid complex employed alone as catalyst.
[d]Dibutylamine employed alone as catalyst.
[e]N-methylmorpholine employed alone as catalyst.
[f]This value is determined by dividing the viscosity obtained in the appropriate example by the viscosity of a comparable formulation employing as the catalyst the same nitrogen or phosphorus compound except that it has not been reacted with HBF$_4$.
[g]Composition viscosity exceeded the test method (>200,000 cps).

Fluoborate Complex Catalyzed Epoxy/Phenolic Systems

What is claimed is:

1. A composition comprising (A) at least one compound containing an average of more than one epoxide group per molecule; (B) at least one compound containing an average of more than one aromatic hydroxyl group per molecule other than an alkenylphenol polymer; and (C) a catalytic quantity at least one of (1) the product resulting from contacting (a) at least one onium compound of the element nitrogen, phosphorus or sulfur with (b) at least one inorganic acid or metal salt of an inorganic acid having a weak-nucleophilic anion; (2) the product resulting from contacting (a) at least one amine compound with (b) at least one inorganic acid having a weak-nucleophilic anion or a combination of such acids; or (3) the product resulting from contacting (a) at least one acid adduct of an amine compound, said acid having a relatively strong-nucleophilic anion with (b) an inorganic acid or metal salt of an inorganic acid, said acid having a weak-nucleophilic anion or a combination of such acids or metal salts; wherein (i) components (a) and (b) are contacted in quantities which permit the composition to satisfy the viscosity requirements of the composition after storage at 50° C. for 14 days; (ii) components (A) and (B) are present in quantities which provide a ratio of aromatic hydroxyl groups to epoxide group of from about 0.05:1 to about 20:1; and (iii) a mixture of components (A), (B), and (C), when dissolved in 20 to 40 percent by weight of a suitable solvent or solvent mixture, has a viscosity measured at 25° C. of 75% or less than the viscosity of a like composition except that the catalyst consists only of component (a), said viscosity being determined after storage for 14 days at 50° C.

2. A composition of claim 1 wherein
(a) components (a) and (b) are contacted in quantities which provide from about 0.6 to about 1.4 moles of component (b) per mole of component (a);
(b) components (A) and (B) are present in quantities which provide a ratio of aromatic hydroxyl groups to epoxide group of from about 0.1:1 to about 10:1; and
(c) component (C) is present in quantities which provide from about 0.05 to about 50 millimoles of catalyst per epoxide equivalent contained in component (A).

3. A composition of claim 2 wherein
(a) components (a) and (b) are contacted in quantities which provide from about 0.75 to about 1.35 moles of component (b) per mole of component (a);
(b) components (A) and (B) are present in quantities which provide a ratio of aromatic hydroxyl groups to epoxide group of from about 0.2:1 to about 5:1; and
(c) component (C) is present in quantities which provide from about 0.1 to about 30 millimoles of catalyst per epoxide equivalent contained in component (A).

4. A composition of claim 3 wherein component (C) is present in quantities which provide from about 0.5 to about 20 millimoles of catalyst per epoxide equivalent contained in component (A).

5. A composition of claim 4 wherein component (C) is present in quantities which provide from about 1 to about 10 millimoles of catalyst per epoxide equivalent contained in component (A).

6. A composition of claim 1, 2, 3, 4 or 5 wherein component (C-1-a) is an onium compound of the element nitrogen, phosphorus or sulfur.

7. A composition of claim 6 wherein
(a) component (C-1-a) is a compound represented by the following formulas IA or IB

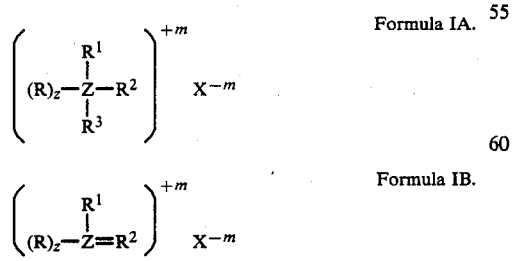

wherein each R, $R^1$, $R^2$ and $R^3$ is independently a hydrocarbyl group having from 1 to about 18, preferably from about 1 to about 9, carbon atoms, or a hydrocarbyl group having from 1 to about 18, preferably from 1 to about 9 carbon atoms which group also contains one or more oxygen, sulfur, halogen, or nitrogen atoms or two of such R, $R^1$, $R^2$ and $R^3$ groups can combine to form a heterocyclic ring containing one or more atoms other than carbon atoms; each X is the anion portion of a relatively strong nucleophiic acid; Z is phosphorus or nitrogen, sulfur; m has a value equal to the valence of the anion X, and z has a value of zero or 1 depending on the valence of Z;

(b) component (C-1-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salts of such acids, and any combination thereof; and (c) component (A) is a glycidyl ether of a compound having an average of more than one aromatic hydroxyl group per molecule or a glycidyl ether of a compound having an average of more than one aliphatic hydroxyl group per molecule or any combination of such compounds.

8. A composition of claim 7 wherein in component (C-1-a) Z is phosphorus.

9. A composition of claim 8 wherein
(a) components (C-1-a) and (C-1-b) are employed in quantities which provide a ratio of moles of component (C-1-b) to moles of (C-1-a) of from about 0.95:1 to about 1.35:1;
(b) component (C-1-a) is ethyl triphenyl phosphonium acetate, ethyl triphenyl phosphonium acetate·acetic acid complex, tetrabutyl phosphonium acetate, tetrabutyl phosphonium acetate·acetic acid complex, ethyl triphenyl phosphonium chloride, ethyl triphenyl phosphonium iodide, tetrabutyl phosphonium chloride, tetrabutyl phosphonium iodide, or any combination thereof;
(c) component (C-1-b) is fluoboric acid;
(d) component (A) is a glycidyl ether of dihydroxyphenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenolhydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
(e) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

10. A composition of claim 9 wherein (a) components (C-1-a) and (C-1-b) are employed in quantities which provide a ratio of moles of component (C-1-b) to moles of (C-1-a) of from about 1.1:1 to about 1.25:1;

(b) component (C-1-a) is ethyl triphenyl phosphonium acetate·acetic acid complex, tetrabutyl phosphonium acetate·acetic acid complex, or any combination thereof;

(c) component (A) is a glycidyl ether of bisphenol A, bisphenol F, bisphenol K, phenol-formaldehyde novolac resin, cresol-formaldehyde novolac resin or any combination thereof; and (d) component (B) is bisphenol A, bisphenol F, bisphenol K, phenol-formaldehyde novolac resin, cresol-formaldehyde novolac resin or any combination thereof.

11. A composition of claim 1, 2, 3, 4 or 5 wherein component (C-2-a) and/or (C-3-a) is a heterocyclic nitrogen-containing compound.

12. A composition of claim 11 wherein component (C-2-a) and/or (C-3a) is selected from imidazoles, imidazolidines, imidazolines, oxazoles, pyrroles, thiazoles, pyridines, pyrazines, morpholines, pyridazines, pyrimidines, pyrrolidines, pyrazoles, quinoxalines, quinazolines, phthalozines, quinolines, purines, indazoles, indoles, indolazines, phenazines, phenarsines, phenothiazines, pyrrolines, indolines, piperidines, piperazines, or any combination thereof.

13. A composition of claim 12 wherein component (C-2-a) and/or (C-3-a) is an imidazole compound.

14. A composition of claim 13 wherein component (C-2-a) and/or (C-3-a) is an imidazole compound represented by the following formula II

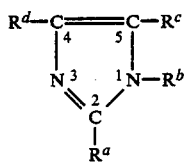

Formula II wherein each $R^a$, $R^b$, $R^c$ and $R^d$ are independently hydrogen, halogen or cyano or a hydrocarbyl group having from 1 to about 18 carbon atoms or such hydrocarbyl groups containing an oxygen, sulfur, cyano or halogen substitutent, or $R^b$ and $R^c$ can combine to form a 5 or 6 membered ring with the carbon and nitrogen atoms from the imidazole ring to which they are attached or $R^c$ and $R^d$ can combine to form a 5 or 6 membered ring with the two carbon atoms from the imidazole ring to which they are attached.

15. A composition of claim 14 wherein
(a) component (C-2-a) is an imidazole compound wherein each $R^a$, $R^b$, $R^c$ and $R^d$ is independently hydrogen or a hydrocarbyl group having from 1 to about 18 carbon atoms;
(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salts of such acids, and any combination thereof; and
(c) component (A) is a glycidyl ether of a compound having an average of more than one aromatic hydroxyl group per molecule or a glycidyl ether of a compound having an average of more than one aliphatic hydroxyl group per molecule or any combination of such compounds.

16. A composition of claim 15 wherein
(a) components (C-2-a) and (C-2-b) are employed in quantities which provide a ratio of moles of component (C-2-b) to moles of (C-2-a) of from about 0.85:1 to about 1.12:1;
(b) component (C-2-a) is 2-ethylimidazole, 2-propylimidazole, 2-butylimidazole, 2-pentylimidazole, 2-hexylimidazole, 2-nonylimidazole, 2-heptadecylimidazole, 2-ethyl-4-methylimidazole, 2-cyclohexylimidazole, 2-phenylimidazole, 2-phenyl-4-methylimidazole, 4-methylimidazole, 1,2-dimethylimidazole, 4,5-diphenylimidazole, 1-allyl-2-methylimidazole, 1-(2-hydroxypropyl)-2-methylimidazole, 2-phenyl-4-methyl-5-methylolimidazole, or any combination thereof;
(c) component (C-2-b) is fluoboric acid;
(d) component (A) is a glycidyl ether of dihydroxy phenol, biphenol, bisphenol, halogenated bisphenol, alkylated bisphenol, trisphenol, phenol-aldehyde resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
(e) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, or any combination thereof.

17. A composition of claim 16 wherein
(a) components (C-2-a) and (C-2-b) are employed in quantities which provide a ratio of moles of component (C-2-b) to moles of (C-2-a) of from about 0.93:1 to about 1.1:1;
(b) component (C-2-a) is 2-ethyl-4-methylimidazole, 4-methylimidazole, 1,2-dimethylimidazole, 2-phenylimidazole, 4,5-diphenylimidazole, or any combination thereof;
(c) component (A) is a glycidyl ether of bisphenol A, bisphenol F, bisphenol K, phenol-formaldehyde novolac resin, cresol-formaldehyde novolac resin or any combination thereof; and
(d) component (B) is bisphenol A, bisphenol F, bisphenol K, phenol-formaldehyde novolac resin, cresol-formaldehyde novolac resin or any combination thereof.

18. A composition of claim 12 wherein component (C-2-a) is a pyrrolidine compound represented by the following formula XII

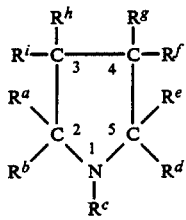

Formula XII.

wherein each $R^a$, $R^b$, $R^c$, $R^d$, $R^e$, $R^f$, $R^g$, $R^h$ and $R^i$ is independently hydrogen, halogen, cyano or a hydrocarbyl group having from 1 to about 18 carbon atoms or such hydrocarbyl groups containing an oxygen, sulfur, cyano or halogen substitutent.

19. A composition of claim 18 wherein
    (a) component (C-2-a) is a pyrrolidine compound wherein each $R^a$, $R^b$, $R^c$, $R^d$, $R^e$, $R^f$, $R^g$, $R^h$ and $R^i$ is independently hydrogen, chloro, bromo, cyano or a hydrocarbyl group having from 1 to about 9 carbon atoms or such hydrocarbyl groups containing an oxygen, sulfur, cyano, chloro or bromo substitutent;
    (b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salts of such acids, and any combination thereof; and
    (c) component (A) is a glycidyl ether of a compound having an average of more than one aromatic hydroxyl group per molecule or a glycidyl ether of a compound having an average of more than one aliphatic hydroxyl group per molecule or any combination of such compounds.

20. A composition of claim 19 wherein
    (a) component (C-2-a) is pyrrolidine, 4-phenylpyrrolidine, 1-methylpyrrolidine, 2-methylpyrrolidine, 3-methylpyrrolidine, 1-butylpyrrolidine, 1-methyl-2-propylpyrrolidine, 3-ethyl-4-methylpyrrolidine, 2-(3-hydroxypropyl)pyrrolidine, 1-phenyl-2-methylpyrrolidine, 2-cyanopyrrolidine, 2-chloropyrrolidine, 2-bromo-1-methylpyrrolidine, or any combination thereof;
    (b) component (C-2-b) is fluoboric acid;
    (c) component (A) is a glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
    (d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, or any combination thereof.

21. A composition of claim 20 wherein
    (a) component (A) is a glycidyl ether of bisphenol A, bisphenol F, bisphenol K, phenol-formaldehyde novolac resin, cresol-formaldehyde novolac resin or any combination thereof; and
    (b) component (B) is bisphenol A, bisphenol F, bisphenol K, phenol-formaldehyde novolac resin, cresol-formaldehyde novolac resin or any combination thereof.

22. A composition of claim 12 wherein component (C-2-a) is a morpholine compound represented by the following formula XIII

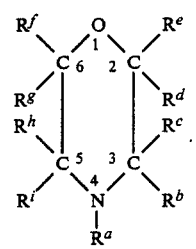

Formula XIII.

wherein each $R^a$, $R^b$, $R^c$, $R^d$, $R^e$, $R^f$, $R^g$, $R^h$ and $R^i$ is independently hydrogen, halogen, cyano or a hydrocarbyl group having from 1 to about 18 carbon atoms or such hydrocarbyl groups containing an oxygen, sulfur, cyano or halogen substituent.

23. A composition of claim 22 wherein
    (a) component (C-2-a) is a morpholine compound represented by formula XIII wherein each $R^a$, $R^b$, $R^c$, $R^d$, $R^e$, $R^f$, $R^g$, $R^h$ and $R^i$ is independently hydrogen, halogen, cyano or a hydrocarbyl group having from 1 to about 9 carbon atoms or such hydrocarbyl groups containing an oxygen, sulfur, cyano, chloro or bromo substituent;
    (b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salts of such acids, and any combination thereof; and
    (c) component (A) is a glycidyl ether of a compound having an average of more than one aromatic hydroxyl group per molecule or a glycidyl ether of a compound having an average of more than one aliphatic hydroxyl group per molecule or any combination of such compounds.

24. A composition of claim 23 wherein
    (a) component (C-2-a) is morpholine, 4-methylmorpholine, 3-methylmorpholine, 4-butylmorpholine, 4-methyl-3-propylmorpholine, 2-ethyl-3methylmorpholine, 4-(3-hydroxypropyl)morpholine, 2-phenylmorpholine, 4-benzylmorpholine, 3-phenyl-1-methylmorpholine, 3-cyanomorpholine, 3-chloromorpholine, 3-bromo-4-methylmorpholine, or any combination thereof;
    (b) component (C-2-b) is fluoboric acid;
    (c) component (A) is a glycidyl ether of dihydroxy phenol, biphenol, bisphenol, halogenated bisphenol, alkylated bisphenol, trisphenol, phenol-aldehyde novolac resin, halogenated phenolaldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and (d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

25. A composition of claim 24 wherein
(a) component (C-2-a) is morpholine, 4-methylmorpholine, or any combination thereof;
(b) component (A) is a glycidyl ether of bisphenol A, bisphenol F, bisphenol K, phenol-formaldehyde novolac resin, cresol-formaldehyde novolac resin or any combination thereof; and
(c) component (B) is bisphenol A, bisphenol F, bisphenol K, phenol-formaldehyde novolac resin, cresol-formaldehyde novolac resin or any combination thereof.

26. A composition of claim 12 wherein component (C-2-a) is a pyridine compound represented by the following formula IX

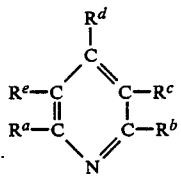

Formula IX.

wherein each $R^a$, $R^b$, $R^c$, $R^d$ and $R^e$ are independently hydrogen, halogen, cyano or a hydrocarbyl group having from 1 to about 18 carbon atoms or such hydrocarbyl groups containing an oxygen, sulfur, cyano or halogen substituent.

27. A composition of claim 26 wherein
(a) component (C-2-a) is a pyridine compound wherein each $R^a$, $R^b$, $R^c$, $R^d$ and $R^e$ are independently hydrogen, bromine, chlorine, cyano or a hydrocarbyl group having from 1 to about 9 carbon atoms or such hydrocarbyl groups containing an oxygen, sulfur, chloro, bromo or cyano substituent;
(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salts of such acids, and any combination thereof; and
(c) component (A) is a glycidyl ether of a compound having an average of more than one aromatic hydroxyl group per molecule or a glycidyl ether of a compound having an average of more than one aliphatic hydroxyl group per molecule or any combination of such compounds.

28. A composition of claim 27 wherein
(a) component (C-2-a) is pyridine, 2-methylpyridine, 3-methylpyridine, 4-butylpyridine, 2-methyl-3-propyl-pyridine, 3-ethyl-4-methylpyridine, 4-(3-hydroxypropyl)pyridine, 2-phenylpyridine, 3-benzylpyridine, 4-phenyl-2-methylpyridine, 3-cyanopyridine, 2-chloropyridine, 3-bromo-5-methylpyridine, or any combination thereof;
(b) component (C-2-b) is fluoboric acid;
(c) component (A) is a glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
(d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, or any combination thereof.

29. A composition of claim 28 wherein
(a) component (C-2-a) is pyridine;
(b) component (A) is a glycidyl ether of bisphenol A, bisphenol F, bisphenol K, phenol-formaldehyde novolac resin, cresol-formaldehyde novolac resin or any combination thereof; and
(c) component (B) is bisphenol A, bisphenol F, bisphenol K, phenol-formaldehyde novolac resin, cresol-formaldehyde novolac resin or any combination thereof.

30. A composition of claim 12 wherein component (C-2-a) is pyrazole compound represented by the following formula III

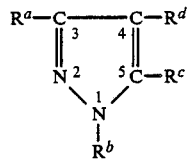

Formula III.

wherein each $R^a$, $R^b$, $R^c$ and $R^d$ is independently hydrogen, halogen, cyano or a hydrocarbyl group having from 1 to about 18 carbon atoms or such hydrocarbyl groups containing an oxygen, sulfur, cyano or halogen or the like substitutent, or $R^b$ and $R^c$ can combine to form a 5 or 6 membered ring with the carbon and nitrogen atoms from the pyrazole ring to which they are attached or $R^c$ and $R^d$ can combine to form a 5 or 6 membered ring with the two carbon atoms from the imidazole ring to which they are attached.

31. A composition of claim 30 wherein
(a) component (C-2-a) is a pyrazole compound wherein each $R^a$, $R^b$, $R^c$, $R^d$ and $R^e$ are independently hydrogen, bromine, chlorine, cyano or a hydrocarbyl group having from 1 to about 9 carbon atoms or such hydrocarbyl groups containing an oxygen, sulfur, chloro, bromo or cyano substituent;
(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salt of such acids, and any combination thereof; and
(c) component (A) is a glycidyl ether of a compound having an average of more than one aromatic hydroxyl group per molecule or a glycidyl ether of a compound having an average of more than one aliphatic hydroxyl group per molecule or any combination of such compounds.

32. A composition of claim 31 wherein
(a) component (C-2-a) is pyrazole, 1-methylpyrazole, 3-methylpyrazole, 4-butylpyrazole, 1-methyl-3-propylpyrazole, 3-ethyl-5-methylpyrazole, 1-(3-hydroxypropyl)pyrazole, 5-phenylpyrazole, 5-benzylpyrazole, 1-phenyl-3-methylpyrazole, 1-cyanopyrazole, 3-chloropyrazole, 4-bromo-1-methyl-pyrazole, or any combination thereof;
(b) component (C-2-b) is fluoboric acid;
(c) component (A) is a glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
(d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, or any combination thereof.

33. A composition of claim 32 wherein
(a) component (A) is a glycidyl ether of bisphenol A, bisphenol F, bisphenol K, phenol-formaldehyde novolac resin, cresol-formaldehyde novolac resin or any combination thereof; and
(b) component (B) is bisphenol A, bisphenol F, bisphenol K, phenol-formaldehyde novolac resin, cresol-formaldehyde novolac resin or any combination thereof.

34. A composition of claim 12 wherein component (C-2-a) is an oxazole compound represented by the following formula IV

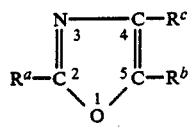

Formula IV.

wherein each $R^a$, $R^b$, and $R^c$ is independently hydrogen, halogen, cyano or a hydrocarbyl group having from 1 to about 18 carbon atoms or such hydrocarbyl groups containing an oxygen, sulfur, cyano or halogen substituent.

35. A composition of claim 34 wherein
(a) component (C-2-a) is an oxazole compound wherein each $R^a$, $R^b$, and $R^c$ are independently hydrogen, bromine, chloride, cyano or a hydrocarbyl group having from 1 to about 9 carbon atoms or such hydrocarbyl groups containing an oxygen, sulfur, chloro, bromo or cyano substituent;
(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, group I or II metal salts of such acids, and any combination thereof; and
(c) component (A) is a glycidyl ether of a compound having an average of more than one aromatic hydroxyl group per molecule or a glycidyl ether of a compound having an average of more than one aliphatic hydroxyl group per molecule or any combination of such compounds.

36. A composition of claim 35 wherein
(a) component (C-2-a) is oxazole, 4-methyloxazole, 2-methyloxazole, 4-butyloxazole, 2-methyl-5-propyloxazole, 2-ethyl-4-methyloxazole, 2-(3-hydroxypropyl)oxazole, 4-phenyloxazole, 5-benzyloxazole, 2-phenyl-5-methyl-oxazole, 2-cyanooxazole, 4-chlorooxazole, 4-bromo-2-methyloxazole, or any combination thereof;
(b) component (C-2-b) is fluoboric acid;
(c) component (A) is glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
(d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, or any combination thereof.

37. A composition of claim 36 wherein (a) component (A) is a glycidyl ether of bisphenol A, bisphenol F, bisphenol K, phenol-formaldehyde novolac resin, cresol-formaldehyde novolac resin or any combination thereof; and (b) component (B) is bisphenol A, bisphenol F, bisphenol K, phenol-formaldehyde novolac resin, cresol-formaldehyde novolac resin or any combination thereof.

38. A composition of claim 12 wherein component (C-2-a) is an imidazolidine compound represented by the following formula V

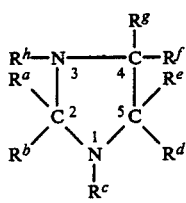

Formula V.

wherein each $R^a$, $R^b$, $R^c$, $R^d$, $R^e$, $R^f$, $R^g$ and $R^h$ is independently hydrogen, halogen, cyano or a hydrocarbyl group having from 1 to about 18 carbon atoms or such hydrocarbyl groups containing an oxygen, sulfur, cyano or halogen substitutent.

39. A composition of claim 38 wherein
(a) component (C-2-a) is an imidazolidine compound wherein each $R^a$, $R^b$, $R^c$, $R^d$, $R^e$, $R^f$, $R^g$ and $R^h$ are independently hydrogen, bromine, chlorine, cyano or a hydrocarbyl group having from 1 to about 9 carbon atoms or such hydrocarbyl groups containing an oxygen, sulfur, chloro, bromo or cyano substituent;

(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salts of such acids, and any combination thereof; and (c) component (A) is a glycidyl ether of a compound having an average of more than one aromatic hydroxyl group per molecule or a glycidyl ether of a compound having an average of more than one aliphatic hydroxyl group per molecule or any combination of such compounds.

40. A composition of claim 39 wherein
(a) component (C-2-a) is imidazolidine, 1-methylimidazolidine, 2-methylimidazolidine, 4-butylimidazolidine, 1-methyl-3-propylimidazolidine, 1-ethyl-4-methyl-imidazolidine, 1-(3-hydroxypropyl)imidazolidine, 2-phenylimidazolidine, 1-benzylimidazolidine, 2-phenyl-1-methylimidazolidine, 4-cyanoimidazolidine, 4-chloroimidazolidine, 4-bromo-1-methylimidazolidine, or any combination thereof;

(b) component (C-2-b) is fluoboric acid;

(c) component (A) is a glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and (d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, or any combination thereof.

41. A composition of claim 40 wherein
(a) component (A) is a glycidyl ether of bisphenol A, bisphenol F, bisphenol K, phenol-formaldehyde novolac resin, cresol-formaldehyde novolac resin or any combination thereof; and (b) component (B) is bisphenol A, bisphenol F, bisphenol K, phenol-formaldehyde novolac resin, cresol-formaldehyde novolac resin or any combination thereof.

42. A composition of claim 12 wherein component (C-2-a) is a imidazoline compound represented by the following formula VI

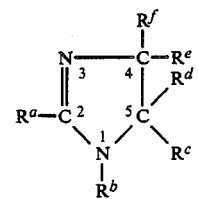

Formula VI.

wherein each $R^a$, $R^b$, $R^c$, $R^d$, $R^e$ and $R^f$ is independently hydrogen, halogen, cyano or a hydrocarbyl group having from 1 to about 18 carbon atoms or such hydrocarbyl groups containing an oxygen, sulfur, cyano or halogen substitutent.

43. A composition of claim 42 wherein
(a) component (C-2-a) is a imidazoline compound wherein each $R^a$, $R^b$, $R^c$, $R^d$, $R^e$, and $R^f$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;

(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salts of such acids, and any combination thereof; and (c) component (A) is a glycidyl ether of a compound having an average of more than one aromatic hydroxyl group per molecule or a glycidyl ether of a compound having an average of more than one aliphatic hydroxyl group per molecule or any combination of such compounds.

44. A composition of claim 43 wherein
(a) component (C-2-a) is imidazoline, 1-methylimidazolidine, 2-methylimidazolidine, 4-butylimidazolidine, 1-methyl-2-propylimidazolidine, 1-ethyl-4-methyl-imidazolidine, 1-(3-hydroxypropyl)imidazolidine, 2-phenylimidazolidine, 1-benzylimidazolidine, 2-phenyl-1-methylimidazolidine, 4-cyanoimidazolidine, 5-chloroimidazolidine, 5-bromo-1-methylimidazolidine, or any combination thereof;
(b) component (C-2-b) is fluoboric acid;
(c) component (A) is a glycidyl ether of dihydroxy phenol, biphenol, bisphenol, halogenated bisphenol, alkylated bisphenol, trisphenol, phenol-aldehyde novolac resin, halogenated phenolaldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
(d) component (B) is a dihydroxy phenol, biphenol, bisphenol, halogenated bisphenol, alkylated bisphenol, trisphenol, phenol-aldehyde novoalac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

45. A composition of claim 44 wherein
(a) component (A) is a glycidyl ether of bisphenol A, bisphenol F, bisphenol K, phenol-formaldehyde novolac resin, cresol-formaldehyde novolac resin or any combination thereof; and
(b) component (B) is bisphenol A, bisphenol F, bisphenol K, phenol-formaldehyde novolac resin, cresol-formaldehyde novolac resin or any combination thereof.

46. A composition of claim 12 wherein component (C-2-a) is a thiazole compound represented by the following formula VII

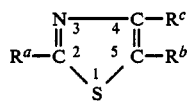

Formula VII.

wherein each $R^a$, $R^b$, and $R^c$ is independently hydrogen, halogen, cyano or a hydrocarbyl group having from 1 to about 18 carbon atoms or such hydrocarbyl groups containing an oxygen, sulfur, cyano or halogen substitutent.

47. A composition of claim 46 wherein
(a) component (C-2-a) is a thiazole wherein each $R^a$, $R^b$, $R^c$ and $R^d$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;
(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salts of such acids, and any combination thereof; and
(c) component (A) is a glycidyl ether of a compound having an average of more than one aromatic hydroxyl group per molecule or a glycidyl ether of a compound having an average of more than one aliphatic hydroxyl group per molecule or any combination of such compounds.

48. A composition of claim 47 wherein
(a) component (C-2-a) is thiazole, 2-methylthiazole, 5-methylthiazole, 4-butylthiazole, 2-methyl-4-propylthiazole, 4-ethyl-5-methylthiazole, 2-(3-hydroxypropyl)thiazole, 2-phenylthiazole, 2-benzylthiazole, 4-phenyl-5-methyl-thiazole, 2-cyanothiazole, 5-chlorothiazole, 5-bromo-3-methylthiazole, or any combination thereof;
(b) component (C-2-b) is fluoboric acid;
(c) component (A) is a glycidyl ether of dihydroxy phenol, biphenol, bisphenol, halogenated bisphenol, alkylated bisphenol, trisphenol, phenol-aldehyde novolac resin, halogenated phenolaldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
(d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

49. A composition of claim 48 wherein
(a) component (A) is a glycidyl ether of bisphenol A, bisphenol F, bisphenol K, phenol-formaldehyde novolac resin, cresol-formaldehyde novolac resin or any combination thereof; and
(b) component (B) is bisphenol A, bisphenol F, bisphenol K, phenol-formaldehyde novolac resin, cresol-formaldehyde novolac resin or any combination thereof.

50. A composition of claim 12 wherein component (C-2-a) is a pyrrole compound represented by the following formula VIII

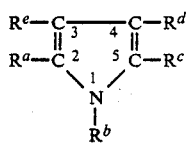

Formula VIII.

wherein each $R^a$, $R^b$, $R^c$, $R^d$ and $R^e$ is independently hydrogen, halogen, cyano or a hydrocarbyl group having from 1 to about 18 carbon atoms or such hydrocarbyl groups containing an oxygen, sulfur, cyano or halogen substitutent.

51. A composition of claim 50 wherein (a) component (C-2-a) is a pyrrole wherein each $R^a$, $R^b$, $R^c$, $R^d$ and $R^e$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;

(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salt of such acids, and any combination thereof; and (c) component (A) is a glycidyl ether of a compound having an average of more than one aromatic hydroxyl group per molecule or a glycidyl ether of a compound having an average of more than one aliphatic hydroxyl group per molecule or any combination of such compounds.

52. A composition of claim 50 wherein (a) component (C-2-a) is pyrrole, 1-methylpyrrole, 2-methylpyrrole, 3-butylpyrrole, 1-methyl-2-propylpyrrole, 2-ethyl-3-methylpyrrole, 1-(3-hydroxypropyl)pyrrole, 2-phenylpyrrole, 1-benzylpyrrole, 2-phenyl-1-methylpyrrole, 3-cyanopyrrole, 3-chloropyrrole, 2-bromo-1-methylpyrrole, or any combination thereof;

(b) component (C-2-b) is fluoboric acid;

(c) component (A) is a glycidyl ether of dihydroxy phenol, biphenol, bisphenol, halogenated bisphenol, alkylated bisphenol, trisphenol, phenol-aldehyde novolac resin, halogenated phenolaldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and (d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

53. A composition of claim 51 wherein (a) component (A) is a glycidyl ether of bisphenol A, bisphenol F, bisphenol K, phenol-formaldehyde novolac resin, cresol-formaldehyde novolac resin or any combination thereof; and (b) component (B) is bisphenol A, bisphenol F, bisphenol K, phenol-formaldehyde novolac resin, cresol-formaldehyde novolac resin or any combination thereof.

54. A composition of claim 12 wherein component (C-2-a) is a pyrazine compound represented by the following formula X

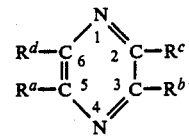

Formula X.

wherein each $R^a$, $R^b$, $R^c$ and $R^d$ is independently hydrogen, or a hydrocarbyl group having from 1 to about 18 carbon atoms or such hydrocarbyl groups containing an oxygen, sulfur, cyano or halogen substitutent.

55. A composition of claim 54 wherein (a) component (C-2-a) is a pyrazine wherein each $R^a$, $R^b$, $R^c$ and $R^d$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;

(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salts of such acids, and any combination thereof; and (c) component (A) is a glycidyl ether of a compound having an average of more than one aromatic hydroxyl group per molecule or a glycidyl ether of a compound having an average of more than one aliphatic hydroxyl group per molecule or any combination of such compounds.

56. A composition of claim 55 wherein (a) component (C-2-a) is pyrazine, 2-methylpyrazine, 3-methylpyrazine, 2-butylpyrazine, 2-methyl-5-propyl-pyrazine, 2-ethyl-6-methylpyrazine, 2-(3-hydroxypropyl)pyrazine, 2-phenylpyrazine, 2-benzylpyrazine, 2-phenyl-3-methylpyrazine, 2-cyanopyrazine, 2-chloropyrazine, 2-bromo-5-methylpyrazine, or any combination thereof;

(b) component (C-2-b) is fluoboric acid;

(c) component (A) is a glycidyl ether of dihydroxy phenol, biphenol, bisphenol, halogenated bisphenol, alkylated bisphenol, trisphenol, phenol-aldehyde novolac resin, halogenated phenolaldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and (d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

57. A composition of claim 56 wherein (a) component (A) is a glycidyl ether of bisphenol A, bisphenol F, bisphenol K, phenol-formaldehyde novolac resin, cresol-formaldehyde novolac resin or any combination thereof; and (b) component (B) is bisphenol A, bisphenol F, bisphenol K, phenol-formaldehyde novolac resin, cresol-formaldehyde novolac resin or any combination thereof.

58. A composition of claim 12 wherein component (C-2-a) is a pyradizine compound represented by the following formula XI

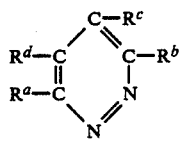

Formula XI.

wherein each $R^a$, $R^b$, $R^c$, and $R^d$ is independently hydrogen, hydrogen, halogen, cyano or a hydrocarbyl group having from 1 to about 18 carbon atoms or such hydrocarbyl groups containing an oxygen, sulfur, cyano or halogen substitutent.

59. A composition of claim 58 wherein (a) component (C-2-a) is a pyradizine wherein each $R^a$, $R^b$, $R^c$, and $R^d$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;

(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salts of such acids, and any combination thereof; and (c) component (A) is a glycidyl ether of a compound having an average of more than one aromatic hydroxyl group per molecule or a glycidyl ether of a compound having an average of more than one aliphatic hydroxyl group per molecule or any combination of such compounds.

60. A composition of claim 59 wherein (a) component (C-2-a) is pyridazine, 3-methylpyridazine, 4-methylpyridazine, 3-butylpyridazine, 3-methyl-4-propylpyridazine, 3-ethyl-6-methyl-pyridazine, 4-(3-hydroxypropyl)pyridazine, 3-phenylpyridazine, 4-benzylpyridazine, 4-phenyl-5-methylpyridazine, 4-cyanopyridazine, 4-chloropyridazine, 3-bromo-5-methylpyridazine, or any combination thereof;

(b) component (C-2-b) is fluoboric acid;

(c) component (A) is a glycidyl ether of dihydroxy phenol, biphenol, bisphenol, halogenated bisphenol, alkylated bisphenol, trisphenol, phenol-aldehyde novolac resin, halogenated phenolaldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and (d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

61. A composition of claim 60 wherein (a) component (A) is a glycidyl ether of bisphenol A, bisphenol F, bisphenol K, phenol-formaldehyde novolac resin, cresol-formaldehyde novolac resin or any combination thereof; and (b) component (B) is bisphenol A, bisphenol F, bisphenol K, phenol-formaldehyde novolac resin, cresol-formaldehyde novolac resin or any combination thereof.

62. A composition of claim 12 wherein component (C-2-a) is a pyrrolidine compound represented by the following formula XII

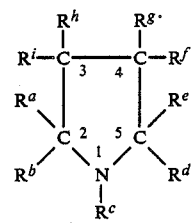

Formula XII.

wherein each $R^a$, $R^b$, $R^c$, $R^d$, $R^e$, $R^f$, $R^g$, $R^h$ and $R^i$ is independently hydrogen, halogen, cyano or a hydrocarbyl group having from 1 to about 18 carbon atoms or such hydrocarbyl groups containing an oxygen, sulfur, cyano or halogen substitutent.

63. A composition of claim 62 wherein (a) component (C-2-a) is a pyrrolidine wherein each $R^a$, $R^b$, $R^c$, $R^d$, $R^e$, $R^f$, $R^g$, $R^h$ and $R^i$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;

(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salts of such acids, and any combination thereof; and (c) component (A) is a glycidyl ether of a compound having an average of more than one aromatic hydroxyl group per molecule or a glycidyl ether of a compound having an average of more than one aliphatic hydroxyl group per molecule or any combination of such compounds.

64. A composition of claim 63 wherein (a) component (C-2-a) is pyrrolidine, 1-methylpyrrolidine, 4-phenylpyrrolidine, 2-methylpyrrolidine, 3-methylpyrrolidine, 1-butylpyrrolidine, 1-methyl-2-propylpyrrolidine, 3-ethyl-4-methyl-pyrrolidine, 2-(3-hydroxypropyl)pyrrolidine, 1-phenyl-2- methylpyrrolidine, 2-cyanopyrrolidine, 2-chloropyrrolidine, 2-bromo-1-methylpyrrolidine, or any combination thereof;

(b) component (C-2-b) is fluoboric acid;

(c) component (A) is a glycidyl ether of dihydroxy phenol, biphenol, bisphenol, halogenated bisphenol, alkylated bisphenol, trisphenol, phenol-aldehyde novolac resin, halogenated phenolaldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and (d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

65. A composition of claim 64 wherein
(a) component (A) is a glycidyl ether of bisphenol A, bisphenol F, bisphenol K, phenol-formaldehyde novolac resin, cresol-formaldehyde novolac resin or any combination thereof; and
(b) component (B) is bisphenol A, bisphenol F, bisphenol K, phenol-formaldehyde novolac resin, cresol-formaldehyde novolac resin or any combination thereof.

66. A composition of claim 12 wherein component (C-2-a) is a pyrimidine compound represented by the following formula XIV

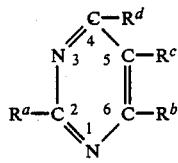

Formula XIV.

wherein each $R^a$, $R^b$, $R^c$ and $R^d$ is independently hydrogen, or a hydrocarbyl group having from 1 to about 18 carbon atoms or such hydrocarbyl groups containing an oxygen, sulfur, cyano or halogen substitutent.

67. A composition of claim 66 wherein
(a) component (C-2-a) is a pyrimidine wherein each $R^a$, $R^b$, $R^c$ and $R^d$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;
(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salts of any such acids, and any combination thereof; and (c) component (A) is a glycidyl ether of a compound having an average of more than one aromatic hydroxyl group per molecule or a glycidyl ether of a compound having an average of more than one aliphatic hydroxyl group per molecule or any combination of such compounds.

68. A composition of claim 67 wherein
(a) component (C-2-a) is pyrimidine, 2-methylpyrimidine, 4-methyl-pyrimidine, 2-butylpyrimidine, 2-methyl-4-propyl-pyrimidine, 4-ethyl-5-methyl-pyrimidine, 2-(3-hydroxypropyl)pyrimidine, 2-phenylpyrimidine, 2-benzylpyrimidine, 4-phenyl-2-methylpyrimidine, 4-cyanopyrimidine, 2-chloropyrimidine, 4-bromo-2-methylpyrimidine, or any combination thereof;

(b) component (C-2-b) is fluoboric acid;

(c) component (A) is a glycidyl ether of dihydroxy phenol, biphenol, bisphenol, halogenated bisphenol, alkylated bisphenol, trisphenol, phenol-aldehyde novolac resin, halogenated phenolaldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and (d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

69. A composition of claim 68 wherein
(a) component (A) is a glycidyl ether of bisphenol A, bisphenol F, bisphenol K, phenol-formaldehyde novolac resin, cresol-formaldehyde novolac resin or any combination thereof; and
(b) component (B) is bisphenol A, bisphenol F, bisphenol K, phenol-formaldehyde novolac resin, cresol-formaldehyde novolac resin or any combination thereof.

70. A composition of claim 12 wherein component (C-2-a) is a quinoxaline compound represented by the following formula XV

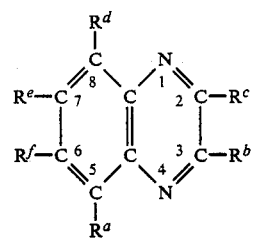

Formula XV.

wherein each $R^a$, $R^b$, $R^c$, $R^d$, $R^e$, and $R^f$ is independently hydrogen, or a hydrocarbyl group having from 1 to about 18 carbon atoms or such hydrocarbyl groups containing an oxygen, sulfur, cyano or halogen substitutent.

71. A composition of claim 70 wherein
(a) component (C-2-a) is a quinoxaline wherein each $R^a$, $R^b$, $R^c$, $R^d$, $R^e$, and $R^f$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;
(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salts of such acids, and any combination thereof; and
(c) component (A) is a glycidyl ether of a compound having an average of more than one aromatic hydroxyl group per molecule or a glycidyl ether of a compound having an average of more than one aliphatic hydroxyl group per molecule or any combination of such compounds.

72. A composition of claim 71 wherein
(a) component (C-2-a) is quinoxaline, 2-methylquinoxaline, 5-methylquinoxaline, 2-butylquinoxaline, 2-methyl-3-propylquinoxaline, 5-ethyl-6-methylquinoxaline, 2-(3-hydroxypropyl)quinoxaline, 2-phenylquinoxaline, 5-benzylquinoxaline, 2-phenyl-5-methylquinoxaline, 2-cyanoquinoxaline, 2-chloroquinoxaline, 2-bromo-5-methylquinoxaline, or any combination thereof;
(b) component (C-2-b) is fluoboric acid;
(c) component (A) is a glycidyl ether of dihydroxy phenol, biphenol, bisphenol, halogenated bisphenol, alkylated bisphenol, trisphenol, phenol-aldehyde novolac resin, halogenated phenolaldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
(d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

73. A composition of claim 72 wherein
(a) component (A) is a glycidyl ether of bisphenol A, bisphenol F, bisphenol K, phenol-formaldehyde novolac resin, cresol-formaldehyde novolac resin or any combination thereof; and
(b) component (B) is bisphenol A, bisphenol F, bisphenol K, phenol-formaldehyde novolac resin, cresol-formaldehyde novolac resin or any combination thereof.

74. A composition of claim 12 wherein component (C-2-a) is a quinazoline compound represented by the following formula

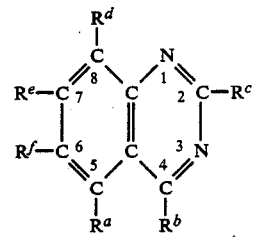

Formula XVI.

wherein each $R^a$, $R^b$, $R^c$, $R^d$, $R^e$, and $R^f$ is independently hydrogen, or a hydrocarbyl group having suitably from 1 to about 18, more suitably from 1 to about 9, carbon atoms or such hydrocarbyl groups containing an oxygen, sulfur, cyano or halogen substituent.

75. A composition of claim 74 wherein
(a) component (C-2-a) is a quinazoline wherein each $R^a$, $R^b$, $R^c$, $R^d$, $R^e$, and $R^f$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;
(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salt of such acids, and any combination thereof; and
(c) component (A) is a glycidyl ether of a compound having an average of more than one aromatic hydroxyl group per molecule or a glycidyl ether of a compound having an average of more than one aliphatic hydroxyl group per molecule or any combination of such compounds.

76. A composition of claim 75 wherein
(a) component (C-2-a) is quinazoline, 2-methylquinazoline, 4-methylquinazoline, 2-butylquinazoline, 2-methyl-4-propylquinazoline, 5-ethyl-6-methyl-quinazoline, 2-(3-hydroxypropyl)quinazoline, 2-phenylquinazoline, 2-benzylquinazoline, 2-phenyl-4-methylquinazoline, 4-cyanoquinazoline, 4-chloroquinazoline, 2-bromo-4-methylquinazoline, or any combination thereof;
(b) component (C-2-b) is fluoboric acid;
(c) component (A) is a glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenolhydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
(d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

77. A composition of claim 76 wherein
(a) component (A) is a glycidyl ether of bisphenol A, bisphenol F, bisphenol K, phenol-formaldehyde novolac resin, cresol-formaldehyde novolac resin or any combination thereof; and
(b) component (B) is bisphenol A, bisphenol F, bisphenol K, phenol-formaldehyde novolac resin, cresol-formaldehyde novolac resin or any combination thereof.

78. A composition of claim 12 wherein component (C-2-a) is a phthalozine compound represented by the following formula XVII

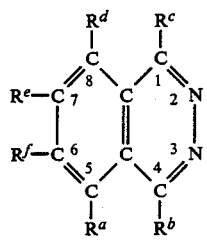

Formula XVII.

wherein each $R^a$, $R^b$, $R^c$, $R^d$, $R^e$, and $R^f$ is independently hydrogen, or a hydrocarbyl group having suitably from 1 to about 18, more suitably from 1 to about 9, carbon atoms or such hydrocarbyl groups containing an oxygen, sulfur, cyano or halogen substitutent.

79. A composition of claim 78 wherein
(a) component (C-2-a) is a phthalozine wherein each $R^a$, $R^b$, $R^c$, $R^d$, $R^e$, and $R^f$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;
(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salt of such acids, and any combination thereof; and
(c) component (A) is a glycidyl ether of a compound having an average of more than one aromatic hydroxyl group per molecule or a glycidyl ether of a compound having an average of more than one aliphatic hydroxyl group per molecule or any combination of such compounds.

80. A composition of claim 79 wherein
(a) component (C-2-a) is phthalazine, 1-methylphthalazine, 6-methylphthalazine, 1-butylphthalazine, 1-methyl-4-propylphthalazine, 1-ethyl-6-methylphthalazine, 1-(3-hydroxypropyl)phthalazine, 5-phenylphthalazine, 1-benzylphthalazine, 1-phenyl-4-methylphthalazine, 1-cyanophthalazine, 1-chlorophthalazine, 1-bromo-4-methylphthalazine, or any combination thereof;
(b) component (C-2-b) is fluoboric acid;
(c) component (A) is a glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenolhydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
(d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

81. A composition of claim 80 wherein
(a) component (A) is a glycidyl ether of bisphenol A, bisphenol F, bisphenol K, phenol-formaldehyde novolac resin, cresol-formaldehyde novolac resin or any combination thereof; and
(b) component (B) is bisphenol A, bisphenol F, bisphenol K, phenol-formaldehyde novolac resin, cresol-formaldehyde novolac resin or any combination thereof.

82. A composition of claim 12 wherein component (C-2-a) is a quinoline compound represented by the following formula XVIII

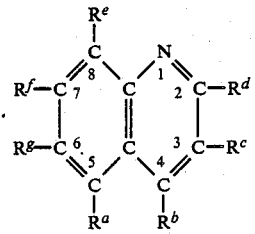

Formula XVIII.

wherein each $R^a$, $R^b$, $R^c$, $R^d$, $R^e$, $R^f$ and $R^g$ is independently hydrogen, or a hydrocarbyl group having suitably from 1 to about 18, more suitably from 1 to about 9, carbon atoms or such hydrocarbyl groups containing an oxygen, sulfur, cyano or halogen substitutent.

83. A composition of claim 81 wherein
(a) component (C-2-a) is a quinoline wherein each $R^a$, $R^b$, $R^c$, $R^d$, $R^e$, $R^f$ and $R^g$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;
(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salt of such acids, and any combination thereof; and
(c) component (A) is a glycidyl ether of a compound having an average of more than one aromatic hydroxyl group per molecule or a glycidyl ether of a compound having an average of more than one aliphatic hydroxyl group per molecule or any combination of such compounds.

84. A composition of claim 83 wherein
(a) component (C-2-a) is quinoline compounds which can be employed herein include, for example, quinoline, 2-methylquinoline, 3-methylquinoline, 4-butylquinoline, 5-methyl-2-propylquinoline, 2-ethyl-3-methylquinoline, 3-(3-hydroxypropyl)-quinoline, 3-phenylquinoline, 4-benzylquinoline, 3-phenyl-2-methylquinoline, 3-cyanoquinoline, 4-chloroquinoline, 2-bromo-3-methylquinoline, or any combination thereof;
(b) component (C-2-b) is fluoboric acid;
(c) component (A) is a glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenolhydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
(d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

85. A composition of claim 84 wherein
(a) component (A) is a glycidyl ether of bisphenol A, bisphenol F, bisphenol K, phenol-formaldehyde novolac resin, cresol-formaldehyde novolac resin or any combination thereof; and
(b) component (B) is bisphenol A, bisphenol F, bisphenol K, phenol-formaldehyde novolac resin, cresol-formaldehyde novolac resin or any combination thereof.

86. A composition of claim 12 wherein component (C-2-a) is a purine compound represented by the following formula XIX

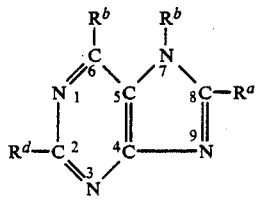

Formula XIX.

wherein each $R^a$, $R^b$, $R^c$ and $R^d$ is independently hydrogen, or a hydrocarbyl group having from 1 to about 18 carbon atoms or such hydrocarbyl groups containing an oxygen, sulfur, cyano or halogen substitutent.

87. A composition of claim 86 wherein
(a) component (C-2-a) is a purine wherein each $R^a$, $R^b$, and $R^c$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;
(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salts of such acid, and any combination thereof; and
(c) component (A) is a glycidyl ether of a compound having an average of more than one aromatic hydroxyl group per molecule or a glycidyl ether of a compound having an average of more than one aliphatic hydroxyl group per molecule or any combination of such compounds.

88. A composition of claim 87 wherein
(a) component (C-2-a) is purine, 2-methylpurine, 8-methylpurine, 6-butylpurine, 2-methyl-8-propylpurine, 6-ethyl-8-methylpurine, 8-(3-hydroxypropyl)-purine, 2-phenylpurine, 2-benzylpurine, 6-phenyl-2-methylpurine, 8-cyanopurine, 2-chloropurine, 8-bromo-2-methylpurine, or any combination thereof;
(b) component (C-2-b) is fluoboric acid;
(c) component (A) is a glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenolhydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
(d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

89. A composition of claim 88 wherein
(a) component (A) is a glycidyl ether of bisphenol A, bisphenol F, bisphenol K, phenol-formaldehyde novolac resin, cresol-formaldehyde novolac resin or any combination thereof; and
(b) component (B) is bisphenol A, bisphenol F, bisphenol K, phenol-formaldehyde novolac resin, cresol-formaldehyde novolac resin or any combination thereof.

90. A composition of claim 12 wherein component (C-2-a) is an indazole compound represented by the following formula XX

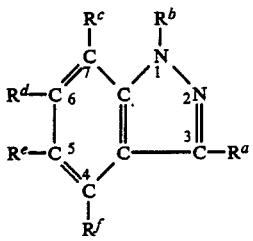

Formula XX.

wherein each $R^a$, $R^b$, $R^c$, $R^d$, $R^e$ and $R^f$ is independently hydrogen, or a hydrocarbyl group having from 1 to about 18 carbon atoms or such hydrocarbyl groups containing an oxygen, sulfur, cyano or halogen substituent.

91. A composition of claim 90 wherein
   (a) component (C-2-a) is an indazole wherein each $R^a$, $R^b$, $R^c$, $R^d$, $R^e$ and $R^f$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;
   (b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salt of such acids, and any combination thereof; and
   (c) component (A) is a glycidyl ether of a compound having an average of more than one aromatic hydroxyl group per molecule or a glycidyl ether of a compound having an average of more than one aliphatic hydroxyl group per molecule or any combination of such compounds.

92. A composition of claim 91 wherein
   (a) component (C-2-a) is indazole, 1-methylindazole, 3-methylindazole, 1-butylindazole, 1-methyl-3-propylindazole, 1-ethyl-5-methylindazole, 3-(3-hydroxypropyl)indazole, 3-phenylindazole, 6-benzylindazole, 6-phenyl-1-methyl-indazole, 3-cyanoindazole, 5-chloroindazole, 3-bromo-1-methylindazole, or any combination thereof;
   (b) component (C-2-b) is fluoboric acid;
   (c) component (A) is a glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenolhydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
   (d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

93. A composition of claim 92 wherein
   (a) component (A) is a glycidyl ether of bisphenol A, bisphenol F, bisphenol K, phenol-formaldehyde novolac resin, cresol-formaldehyde novolac resin or any combination thereof; and
   (b) component (B) is bisphenol A, bisphenol F, bisphenol K, phenol-formaldehyde novolac resin, cresol-formaldehyde novolac resin or any combination thereof.

94. A composition of claim 12 wherein component (C-2-a) is an indole compound represented by the following formula XXI

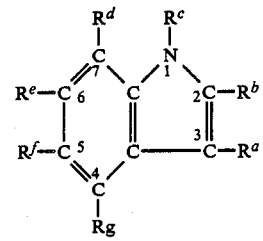

Formula XXI.

wherein each $R^a$, $R^b$, $R^c$, $R^d$, $R^e$, $R^f$ and $R^g$ is independently hydrogen, or a hydrocarbyl group having from 1 to about 18 carbon atoms or such hydrocarbyl groups containing an oxygen, sulfur, cyano or halogen substituent.

95. A composition of claim 94 wherein
   (a) component (C-2-a) is an indole wherein each $R^a$, $R^b$, $R^c$, $R^d$, $R^e$, $R^f$ and $R^g$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;
   (b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salt of such acids, and any combination thereof; and
   (c) component (A) is a glycidyl ether of a compound having an average of more than one aromatic hydroxyl group per molecule or a glycidyl ether of a compound having an average of more than one aliphatic hydroxyl group per molecule or any combination of such compounds.

96. A composition of claim 95 wherein
   (a) component (C-2-a) is indole, 1-methylindole, 2-methylindole, 3-butylindole, 1-methyl-2-propylindole, 2-ethyl-3-methylindole, 1-(3-hydroxypropyl)indole, 2-phenylindole, 1-benzylindole, 2-phenyl-1-methylindole, 2-cyanoindole, 5-chloroindole, 3-bromo-1-methylindole, or any combination thereof;
   (b) component (C-2-b) is fluoboric acid;
   (c) component (A) is a glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenolhydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and (d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

97. A composition of claim 96 wherein
(a) component (A) is a glycidyl ether of bisphenol A, bisphenol F, bisphenol K, phenol-formaldehyde novolac resin, cresol-formaldehyde novolac resin or any combination thereof; and
(b) component (B) is bispenol A, bisphenol F, bisphenol K, phenol-formaldehyde novolac resin, cresol-formaldehyde novolac resin or any combination thereof.

98. A composition of claim 12 wherein component (C-2-a) is an indolazine compound represented by the following formula XXII

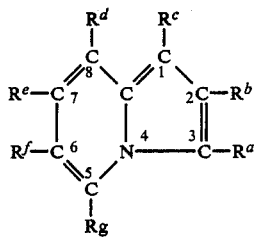

Formula XXII.

wherein each $R^a$, $R^b$, $R^c$, $R^d$, $R^e$, $R^f$ and $R^g$ is independently hydrogen, or a hydrocarbyl group having from 1 to about 18 carbon atoms or such hydrocarbyl groups containing an oxygen, sulfur, cyano or halogen substitutent.

99. A composition of claim 98 wherein
(a) component (C-2-a) is an indolazine wherein each $R^a$, $R^b$, $R^c$, $R^d$, $R^e$, $R^f$ and $R^g$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;
(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salt of such acids, and any combination thereof; and
(c) component (A) is a glycidyl ether of a compound having an average of more than one aromatic hydroxyl group per molecule or a glycidyl ether of a compound having an average of more than one aliphatic hydroxyl group per molecule or any combination of such compounds.

100. A composition of claim 99 wherein
(a) component (C-2-a) is indolazine, 1-methylindolizine, 2-methylindolizine, 3-butylindolizine, 5-methyl-1-propylindolizine, 2-ethyl-1-methyl-indolizine, 6-(3-hydroxypropyl)indolizine, 3-phenylindolizine, 7-benzylindolizine, 2-phenyl-3-methylindolizine, 5-cyanoindolizine, 7-chloroindolizine, 3-bromo-5-methylindolizine, or any combination thereof;
(b) component (C-2-b) is fluoboric acid;
(c) component (A) is a glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenolhydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
(d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

101. A composition of claim 100 wherein
(a) component (A) is a glycidyl ether of bisphenol A, bisphenol F, bisphenol K, phenol-formaldehyde novolac resin, cresol-formaldehyde novolac resin or any combination thereof; and
(b) component (B) is bisphenol A, bisphenol F, bisphenol K, phenol-formaldehyde novolac resin, cresol-formaldehyde novolac resin or any combination thereof.

102. A composition of claim 12 wherein component (C-2-a) is a phenazine compound represented by the following formula XXIII

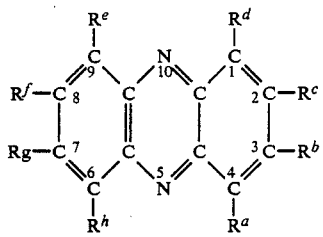

Formula XXIII.

wherein each $R^a$, $R^b$, $R^c$, $R^d$, $R^e$, $R^f$, $R^g$ and $R^h$ is independently hydrogen, or a hydrocarbyl group having from 1 to about 18 carbon atoms or such hydrocarbyl groups containing an oxygen, sulfur, cyano or halogen substitutent.

103. A composition of claim 102 wherein
(a) component (C-2-a) is a phenazine wherein each $R^a$, $R^b$, $R^c$, $R^d$, $R^e$, $R^f$, $R^g$ and $R^h$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;
(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salt of such acids, and any combination thereof; and (c) component (A) is a glycidyl ether of a compound having an average of more than one aromatic hydroxyl group per molecule or a glycidyl ether of a compound having an average of more than one aliphatic hydroxyl group per molecule or any combination of such compounds.

104. A composition of claim 103 wherein
(a) component (C-2-a) is phenazine, 1-methylphenazine, 2-methylphenazine, 2-butylphenazine, 1-methyl-7-propylphenazine, 1-ethyl-4-methylphenazine, 2-(3-hydroxypropyl)phenazine, 1-phenylphenazine, 1-benzylphenazine, 1-phenyl-7-methylphenazine, 2-cyanophenazine, 1-chlorophenazine, 1-bromo-2-methylphenazine, or any combination thereof;
(b) component (C-2-b) is fluoboric acid;
(c) component (A) is a glycidyl ether of dihyroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenolhydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
(d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

105. A composition of claim 104 wherein
(a) component (A) is a glycidyl ether of bisphenol A, bisphenol F, bisphenol K, phenol-formaldehyde novolac resin, cresol-formaldehyde novolac resin or any combination thereof; and
(b) component (B) is bisphenol A, bisphenol F, bisphenol K, phenol-formaldehyde novolac resin, cresol-formaldehyde novolac resin or any combination thereof.

106. A composition of claim 12 wherein component (C-2-a) is a phenarsazine compound represented by the following formula XXIV.

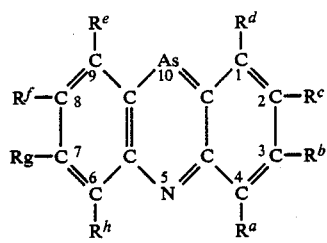

Formula XXIV.

wherein each $R^a$, $R^b$, $R^c$, $R^d$, $R^e$, $R^f$, $R^g$ and $R^h$ is independently hydrogen, or a hydrocarbyl group having from 1 to about 18 carbon atoms or such hydrocarbyl groups containing an oxygen, sulfur, cyano or halogen substitutent.

107. A composition of claim 106 wherein
(a) component (C-2-a) is a phenarsazine wherein each $R^a$, $R^b$, $R^c$, $R^d$, $R^e$, $R^f$, $R^g$ and $R^h$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;
(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salt of such acids, and any combination thereof; and
(c) component (A) is a glycidyl ether of a compound having an average of more than one aromatic hydroxyl group per molecule or a glycidyl ether of a compound having an average of more than one aliphatic hydroxyl group per molecule or any combination of such compounds.

108. A composition of claim 107 wherein
(a) component (C-2-a) is phenarsazine, 1-methylphenarsazine, 2-methylphenarsazine, 4-butylphenarsazine, 1-methyl-6-propylphenarsazine, 2-ethyl-3-methylphenarsazine, 1-(3-hydroxypropyl)-phenarsazine, 4-phenylphenarsazine, 3-benzylphenarsazine, 2-phenyl-7-methylphenarsazine, 3-cyanophenarsazine, 1-chlorophenarsazine, 1-bromo-8-methylphenarsazine, or any combination thereof;
(b) component (C-2-b) is fluoboric acid;
(c) component (A) is a glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenolhydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
(d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

109. A composition of claim 108 wherein
(a) component (A) is a glycidyl ether of bisphenol A, bisphenol F, bisphenol K, phenol-formaldehyde novolac resin, cresol-formaldehyde novolac resin or any combination thereof; and
(b) component (B) is bisphenol A, bisphenol F, bisphenol K, phenol-formaldehyde novolac resin, cresol-formaldehyde novolac resin or any combination thereof.

110. A composition of claim 12 wherein component (C-2-a) is a phenothiazine compound represented by the following formula XXV

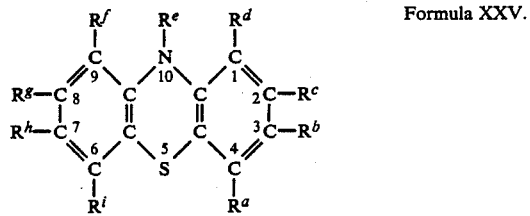

Formula XXV.

wherein each $R^a$, $R^b$, $R^c$, $R^d$, $R^e$, $R^f$, $R^g$, $R^h$ and $R^i$ is independently hydrogen, or a hydrocarbyl group having from 1 to about 18 carbon atoms or such hydrocarbyl groups containing an oxygen, sulfur, cyano or halogen substitutent.

111. A composition of claim 110 wherein
   (a) component (C-2-a) is a phenothiazine wherein each $R^a$, $R^b$, $R^c$, $R^d$, $R^e$, $R^f$, $R^g$, $R^h$ and $R^i$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;
   (b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salt of such acids, and any combination thereof; and
   (c) component (A) is a glycidyl ether of a compound having an average of more than one aromatic hydroxyl group per molecule or a glycidyl ether of a compound having an average of more than one aliphatic hydroxyl group per molecule or any combination of such compounds.

112. A composition of claim 111 wherein
   (a) component (C-2-a) is phenothiazine, 10-methylphenothiazine, 1-methylphenothiazine, 2-butylphenothiazine, 10-methyl-4-propylphenothiazine, 2-ethyl-3-methyl-phenothiazine, 4-(3-hydroxypropyl)phenothiazine, 10-phenylphenothiazine, 1-benzylphenothiazine, 10-phenyl-4-methylphenothiazine, 7-cyanophenothiazine, 4-chlorophenothiazine, 4-bromo-10-methylphenothiazine, or any combination thereof;
   (b) component (C-2-b) is fluoboric acid;
   (c) component (A) is a glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenolhydroxybenzaldehyde resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
   (d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

113. A composition of claim 112 wherein
   (a) component (A) is a glycidyl ether of bisphenol A, bisphenol F, bisphenol K, phenol-formaldehyde novolac resin, cresol-formaldehyde novolac resin or any combination thereof; and
   (b) component (B) is bisphenol A, bisphenol F, bisphenol K, phenol-formaldehyde novolac resin, cresol-formaldehyde novolac resin or any combination thereof.

114. A composition of claim 12 wherein component (C-2-a) is a pyrroline compound represented by the following formula XXVI

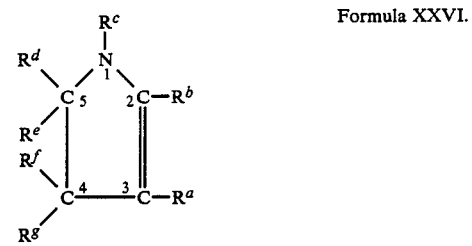

Formula XXVI.

wherein each $R^a$, $R^b$, $R^c$, $R^d$, $R^e$, $R^f$ and $R^g$ is independently hydrogen, or a hydrocarbyl group having from 1 to about 18 carbon atoms or such hydrocarbyl groups containing an oxygen, sulfur, cyano or halogen substitutent.

115. A composition of claim 114 wherein
   (a) component (C-2-a) is a pyrroline wherein each $R^a$, $R^b$, $R^c$, $R^d$, $R^e$, $R^f$ and $R^g$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;
   (b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salt of such acids, and any combination thereof; and
   (c) component (A) is a glycidyl ether of a compound having an average of more than one aromatic hydroxyl group per molecule or a glycidyl ether of a compound having an average of more than one aliphatic hydroxyl group per molecule or any combination of such compounds.

116. A composition of claim 115 wherein
   (a) component (C-2-a) is pyrroline, 2-methylpyrroline, 4-methyl-pyrroline, 5-butylpyrroline, 5-methyl-1-propyl-pyrroline, 1-ethyl-3-methylpyrroline, 1-(3-hydroxypropyl)pyrroline, 5-phenylpyrroline, 1-benzylpyrroline, 1-phenyl-4-methylpyrroline, 3-cyanopyrroline, 5-chloropyrroline, 2-bromo-1-methylpyrroline, or any combination thereof;
   (b) component (C-2-b) is fluoboric acid;

(c) component (A) is a glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenolhydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and (d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenolhydroxybenzaldehyde resin, alkylated phenolhydroxybenzaldehyde resin, hydrocarbon-phenol resin, hydrocarbon-halogenated phenol resin, hydrocarbon-alkylated phenol resin, or any combination thereof.

117. A composition of claim 116 wherein (a) component (A) is a glycidyl ether of bisphenol A, bisphenol F, bisphenol K, phenol-formaldehyde novolac resin, cresol-formaldehyde novolac resin or any combination thereof; and (b) component (B) is bisphenol A, bisphenol F, bisphenol K, phenol-formaldehyde novolac resin, cresol-formaldehyde novolac resin or any combination thereof.

118. A composition of claim 12 wherein component (C-2-a) is an indoline compound represented by the following formula XXVII

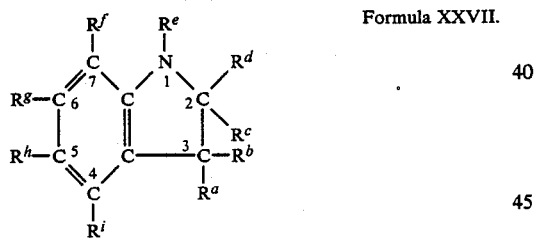

Formula XXVII.

wherein each $R^a$, $R^b$, $R^c$, $R^d$, $R^e$, $R^f$, $R^g$, $R^h$ and $R^i$ is independently hydrogen, or a hydrocarbyl group having from 1 to about 18 carbon atoms or such hydrocarbyl groups containing an oxygen, sulfur, cyano or halogen substitutent.

119. A composition of claim 118 wherein (a) component (C-2-a) is an indoline wherein each $R^a$, $R^b$, $R^c$, $R^d$, $R^e$, $R^f$, $R^g$, $R^h$ and $R^i$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;

(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid Group I or II metal salt of such acids, and any combination thereof; and (c) component (A) is a glycidyl ether of a compound having an average of more than one aromatic hydroxyl group per molecule or a glycidyl ether of a compound having an average of more than one aliphatic hydroxyl group per molecule or any combination of such compounds.

120. A composition of claim 119 wherein (a) component (C-2-a) is indoline, 1-methylindoline, 2-methylindoline, 3-butylindoline, 1-methyl-2-propyl-indoline, 2-ethyl-2-methylindoline, 1-(3-hydroxypropyl)indoline, 1-phenylindoline, 1-benzylindoline, 1-phenyl-2-methylindoline, 5-cyanoindoline, 7-chloroindoline, 5-bromo-1-methylindoline, or any combination thereof;

(b) component (C-2-b) is fluoboric acid;

(c) component (A) is a glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and (d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, or any combination thereof.

121. A composition of claim 120 wherein (a) component (A) is a glycidyl ether of bisphenol A, bisphenol F, bisphenol K, phenol-formaldehyde novolac resin, cresol-formaldehyde novolac resin or any combination thereof; and (b) component (B) is bisphenol A, bisphenol F, bisphenol K, phenol-formaldehyde novolac resin, cresol-formaldehyde novolac resin or any combination thereof.

122. A composition of claim 12 wherein component (C-2-a) is a piperidine compound represented by the following formula XXVIII

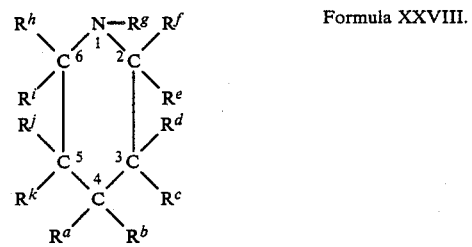

Formula XXVIII.

wherein each $R^a$, $R^b$, $R^c$, $R^d$, $R^e$, $R^f$, $R^g$, $R^h$, $R^i$, $R^j$ and $R^k$ is independently hydrogen, or a hydrocarbyl group having from 1 to about 18 carbon atoms or such hydrocarbyl groups containing an oxygen, sulfur, cyano or halogen substitutent.

123. A composition of claim 122 wherein (a) component (C-2-a) is a wherein each $R^a$, $R^b$, $R^c$, $R^d$, $R^e$, $R^f$, $R^g$, $R^h$, $R^i$, $R^j$ and $R^k$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;

(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salt of such acids, and any combination thereof; and (c) component (A) is a glycidyl ether of a compound having an average of more than one aromatic hydroxyl group per molecule or a glycidyl ether of a compound having an average of more than one aliphatic hydroxyl group per molecule or any combination of such compounds.

124. A composition of claim 123 wherein
(a) component (C-2-a) is piperidine, 1-methylpiperidine, 2-methylpiperidine, 3-butylpiperidine, 1-methyl-2-propylpiperidine, 2-ethyl-4-methylpiperidine, 1-(3-hydroxypropyl)piperidine, 1-phenylpiperidine, 1-benzylpiperidine, 1-phenyl-2-methylpiperidine, 4-cyanopiperidine, 3-chloropiperidine, 4-bromo-1-methylpiperidine, or any combination thereof;
(b) component (C-2-b) is fluoboric acid;
(c) component (A) is a glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
(d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, or any combination thereof.

125. A composition of claim 124 wherein
(a) component (A) is a glycidyl ether of bisphenol A, bisphenol F, bisphenol K, phenol-formaldehyde novolac resin, cresol-formaldehyde novolac resin or any combination thereof; and
(b) component (B) is bisphenol A, bisphenol F, bisphenol K, phenol-formaldehyde novolac resin, cresol-formaldehyde novolac resin or any combination thereof.

126. A composition of claim 12 wherein component (C-2-a) is a piperazine compound represented by the following formula XXIX

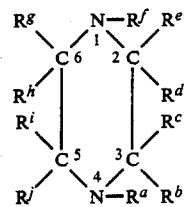

Formula XXIX.

wherein each $R^a$, $R^b$, $R^c$, $R^d$, $R^e$, $R^f$, $R^g$, $R^h$, $R^i$ and $R^j$ is independently hydrogen, or a hydrocarbyl group having from 1 to about 18 carbon atoms or such hydrocarbyl groups containing an oxygen, sulfur, cyano or halogen substitutent.

127. A composition of claim 126 wherein
(a) component (C-2-a) is a piperazine wherein each $R^a$, $R^b$, $R^c$, $R^d$, $R^e$, $R^f$, $R^g$, $R^h$, $R^i$ and $R^j$ is independently hydrogen, bromine, chlorine, cyano or a hydrocarbyl group having from 1 to about 9 carbon atoms or such hydrocarbyl groups containing an oxygen, sulfur, chloro, bromo or cyano substituent;

(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salt of such acids, and any combination thereof; and (c) component (A) is a glycidyl ether of a compound having an average of more than one aromatic hydroxyl group per molecule or a glycidyl ether of a compound having an average of more than one aliphatic hydroxyl group per molecule or any combination of such compounds.

128. A composition of claim 127 wherein
(a) component (C-2-a) is piperazine, 1-methylpiperazine, 2-methylpiperazine, 3-butylpiperazine, 1-methyl-2-propylpiperazine, 2-ethyl-4-methylpiperazine, 1-(3-hydroxypropyl)piperazine, 1-phenylpiperazine, 1-benzylpiperazine, 1-phenyl-2-methylpiperazine, 4-cyanopiperazine, 3-chloropiperazine, 4-bromo-1-methylpiperazine, or any combination thereof;
(b) component (C-2-b) is fluoboric acid;
(c) component (A) is a glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
(d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, or any combination thereof.

129. A composition of claim 128 wherein
(a) component (A) is a glycidyl ether of bisphenol A, bisphenol F, bisphenol K, phenol-formaldehyde novolac resin, cresol-formaldehyde novolac resin or any combination thereof; and
(b) component (B) is bisphenol A, bisphenol F, bisphenol K, phenol-formaldehyde novolac resin, cresol-formaldehyde novolac resin or any combination thereof.

130. A composition of claim 1, 2, 3, 4 or 5 wherein component (C-2-a) is a primary, secondary or tertiary aliphatic, cycloaliphatic, or aromatic non-heterocyclic amine.

131. A composition of claim 130 wherein component (C-2-a) is a primary, aliphatic, non-heterocyclic amine, said aliphatic groups having from 1 to about 20 carbon atoms.

132. A composition of claim 131
(a) wherein component (C-2-a) is a primary, aliphatic, non-heterocyclic amine, said aliphatic groups having from 2 to about 10 carbon atoms;
(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salts of such acids, and any combination thereof; and
(c) component (A) is a glycidyl ether of a compound having an average of more than one aromatic hydroxyl group per molecule or a glycidyl ether of a compound having an average of more than one aliphatic hydroxyl group per molecule or any combination of such compounds.

133. A composition of claim 132 wherein
(a) component (C-2-a) is ethylamine, n-propylamine, isopropylamine, butylamine, or any combination thereof;
(b) component (C-2-b) is fluoboric acid;
(c) component (A) is a glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
(d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, or any combination thereof.

134. A composition of claim 133 wherein
(a) component (C-2-a) is butylamine;
(b) component (A) is a glycidyl ether of bisphenol A, bisphenol F, bisphenol K, phenol-formaldehyde novolac resin, cresol-formaldehyde novolac resin or any combination thereof; and
(c) component (B) is bisphenol A, bisphenol F, bisphenol K, phenol-formaldehyde novolac resin, cresol-formaldehyde novolac resin or any combination thereof.

135. A composition of claim 130 wherein component (C-2-a) is a secondary, aliphatic, non-heterocyclic amine, said aliphatic groups having from 1 to about 20 carbon atoms.

136. A composition of claim 135 wherein component (C-2-a) is a secondary, aliphatic, non-heterocyclic amine, said aliphatic groups having from 2 to about 10 carbon atoms.

137. A composition of claim 136 wherein
(a) component (C-2-a) is diethylamine, di-n-propylamine, diisopropylamine, dibutylamine, or any combination thereof;
(b) component (C-2-b) is fluoboric acid;
(c) component (A) is a glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
(d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, or any combination thereof.

138. A composition of claim 137 wherein
(a) component (C-2-a) is dibutylamine;
(b) component (A) is a glycidyl ether of bisphenol A, bisphenol F, bisphenol K, phenol-formaldehyde novolac resin, cresol-formaldehyde novolac resin or any combination thereof; and
(c) component (B) is bisphenol A, bisphenol F, bisphenol K, phenol-formaldehyde novolac resin, cresol-formaldehyde novolac resin or any combination thereof.

139. A composition of claim 130 wherein component (C-2-a) is a tertiary, aliphatic, non-heterocyclic amine, said aliphatic groups having from 1 to about 20 carbon atoms.

140. A composition of claim 139 wherein
(a) component (C-2-a) is a tertiary, aliphatic, non-heterocyclic amine, said aliphatic groups having from 2 to about 10 carbon atoms
(b) component (C-2-b) is selected from the group consisting of fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid, Group I or II metal salts of such acids, and any combination thereof; and (c) component (A) is a glycidyl ether of a compound having an average of more than one aromatic hydroxyl group per molecule or a glycidyl ether of a compound having an average of more than one aliphatic hydroxyl group per molecule or any combination of such compounds.

141. A composition of claim 140 wherein
(a) component (C-2-a) is triethylamine, tri-n-propylamine, triisopropylamine, tributylamine, or any combination thereof;
(b) component (C-2-b) is fluoboric acid;
(c) component (A) is a glycidyl ether of dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, aliphatic diol, aliphatic triol, polyetherdiol, polyethertriol, the alkylene oxide adduct of a compound containing an average of more than one aromatic hydroxyl group per molecule, or any combination thereof; and
(d) component (B) is a dihydroxy phenol, biphenol, bisphenol, halogenated bisphenol, alkylated bisphenol, trisphenol, phenol-aldehyde novolac resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, or any combination thereof.

142. A composition of claim 141 wherein
(a) component (C-2-a) is triethylamine;
(b) component (A) is a glycidyl ether of bisphenol A, bisphenol F, bisphenol K, phenol-formaldehyde novolac resin, cresol-formaldehyde novolac resin or any combination thereof; and
(c) component (B) is bisphenol A, bisphenol F, bisphenol K, phenol-formaldehyde novolac resin, cresol-formaldehyde novolac resin or any combination thereof.

* * * * *

UNITED STATES PATENT AND TRADEMARK OFFICE
CERTIFICATE OF CORRECTION

PATENT NO. : 4,925,901

DATED : May 15, 1990

INVENTOR(S) : James L. Bertram, Louis L. Walker, John W. Muskopf

It is certified that error appears in the above-identified patent and that said Letters Patent is hereby corrected as shown below:

Column 4, line 8; change "acetatee•acetic" to read --acetate•acetic--.

Column 15, lines 40-41; delete --1-benzylindoline, 1-phenyl-2-methylindoline,--.

Column 15, line 64; change "substitutent,." to read --substitutent.--.

Column 16, line 49; change "sets of" to read --salts of--.

Column 30, Table VII, under column heading %of Control Viscosity$^f$; change "After Day" to read --After 1 Day--.

Column 30, second footnote; change "are disignated by" to read --are designated by--.

Column 32, line 8; change "nucleophiic" to read --nucleophilic--.

Column 33, line 21; change "(C-3a)" to read --(C-3-a)--.

Column 36, line 59; change "2-ethyl-3methyl-" to read --2-ethyl-3-methyl- --.

Column 40, line 16; change "chloride," to read --chlorine,--.

Column 43, line 24; change "novoalac" to read --novolac--.

UNITED STATES PATENT AND TRADEMARK OFFICE
CERTIFICATE OF CORRECTION

PATENT NO. : 4,925,901

DATED : May 15, 1990

INVENTOR(S) : James L. Bertram, Louis L. Walker, John W. Muskopf

It is certified that error appears in the above-identified patent and that said Letters Patent is hereby corrected as shown below:

Column 55, Formula XIX; change

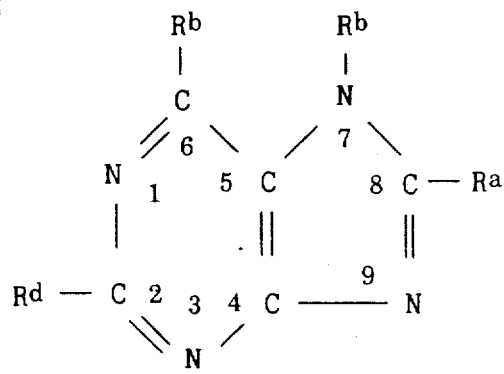   to read --   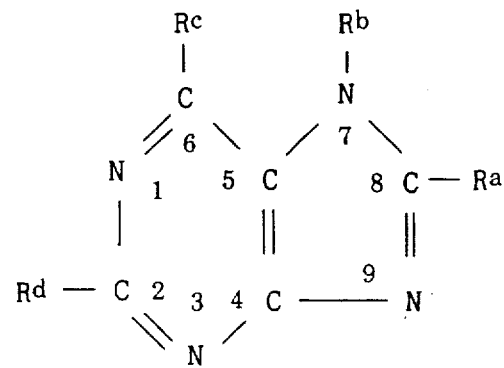

Signed and Sealed this

Twenty-fifth Day of August, 1992

*Attest:*

DOUGLAS B. COMER

*Attesting Officer*   Acting Commissioner of Patents and Trademarks